(12) United States Patent
Tuohino et al.

(10) Patent No.: US 7,974,295 B2
(45) Date of Patent: Jul. 5, 2011

(54) OPTIMIZED ROUTING BETWEEN COMMUNICATION NETWORKS

(75) Inventors: Markku Tuohino, Espoo (FI); Ilkka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 1777 days.

(21) Appl. No.: 10/521,155

(22) PCT Filed: Jul. 16, 2002

(86) PCT No.: PCT/IB02/02782
§ 371 (c)(1),
(2), (4) Date: Jan. 13, 2005

(87) PCT Pub. No.: WO2004/008786
PCT Pub. Date: Jan. 22, 2004

(65) Prior Publication Data
US 2005/0286531 A1 Dec. 29, 2005

(51) Int. Cl.
*H04L 12/28* (2006.01)
(52) U.S. Cl. ......... 370/401; 370/471; 370/352; 370/392
(58) Field of Classification Search .................. None
See application file for complete search history.

(56) References Cited

U.S. PATENT DOCUMENTS
6,871,070 B2 * 3/2005 Ejzak .................. 455/435.1

FOREIGN PATENT DOCUMENTS
| WO | WO 99/11087 | 3/1999 |
|---|---|---|
| WO | WO 99/22566 | 5/1999 |
| WO | WO 00/79825 A1 | 12/2000 |
| WO | WO 02/43405 A1 | 5/2002 |

OTHER PUBLICATIONS

3GPP TS 29.163 V1.2.0, "*3RD Generation Partnership Project; Technical Specification Group Core Network; Interworking Between the IM CN Subsystem and CS Networks*" Mar. 2002, pp. 1-15.
Mealling, M. et al., "*The Naming Authority Pointer (NAPTR) DNS Record*", Standards Track, Sep. 2000, pp. 1-17.
Faltstrom, P. et al., "*E.164 Number and DNS*", Standards Track, Sep. 2000, pp. 1-10.
Gulbrandsen, A. et al., "*A DNS RR for Specifying the Location of Services (DNS SRV)*", Standards Track, Feb. 2000, pp. 1-12.
Rosenberg, J. et al., "*A Framework for Telephony Routing over IP*", Informational, Jun. 2000, pp. 1-24.
3GPP TS 23.228 v5.5.0, "*3rd Generation Partnership Project; Technical Specification Group Services and System Aspects; IP Multimedia Subsystem (IMS); Stage 2 (Release 5)*" Jun. 2002, pp. 1-129.

(Continued)

*Primary Examiner* — Duc C Ho
(74) *Attorney, Agent, or Firm* — Harrington & Smith

(57) ABSTRACT

The invention provides a method and system for routing a message or a set of messages or a session from a first equipment connected or registered to a first network, to a second equipment connected or registered to a second network. The first network includes a network entity which checks requirements of the message or set of messages or session, and decides on the routing depending on the check result. The checked requirements may include media requirements of the message or set of messages or requested session. The checked requirements can also include QoS requirements of the message or set of messages or requested session.

13 Claims, 15 Drawing Sheets

OTHER PUBLICATIONS

Rosenberg, J. et al., "*SIP: Session Initiation Protocol*", Standards Track, Jun. 2002, pp. 1-182.

3GPP TS 24.229 V5.0.0, "*3RD Generation Partnership Project; Technical Specification Group Core Network; IP Multimedia Call Control Protocol Based on SIP and SDP; Stage 3 (Release 5)*", Mar. 2002, pp. 1-287.

3GPP TS 24.228 V5.0.0, "*3rd Generation Partnership Project; Technical Specification Group Core Network; Signalling Flows for the IP Multimedia Call Control Based on SIP and SDP; Stage 3 (Release 5)*", Mar. 2002, pp. 1-681.

European Office Action application No. 02 745 716.7-1249 dated May 30, 2007.

* cited by examiner

Example of NAPTR RRs for routing to Sonera's own MGCFs and Radiolinja's BGCF
(358-40-56xxxxxx to Sonera's MGCF1):
(358-40-4xxxxxxx to Sonera's MGCF2):
(358-50-xxxxxxxx to Radiolinja's BGCF): Bare prefix can be used because IMS E.164 messages and/or sets of messages and/or sessions (i.e. +358-50-22xxxxxx) are already routed from the originating S-CSCF to Radiolinja's I-CSCF.

$ORIGIN 6.5.0.4.8.5.3.local_routing_enum.e164.ims.sonera.fi.
* IN NAPTR 100 10 "u" "sip+E2U" "!(^.*$)!sip:\1@mgcf1.ims.sonera.fi!" .
$ORIGIN 4.0.4.8.5.3.local_routing_enum.e164.ims.sonera.fi.
* IN NAPTR 100 10 "u" "sip+E2U" "!(^.*$)!sip:\1@mgcf2.ims.sonera.fi!" .
$ORIGIN 0.5.8.5.3.local_routing_enum.e164.ims.sonera.fi.
* IN NAPTR 100 10 "u" "sip+E2U" "!(^.*$)!sip:\1@bgcf.ims.radiolinja.fi!" .

Utilized ENUM-DNS databases at the originating BGCF

FQDNs of the own MGCFs and foreign BGCFs

FIG. 6

E.164 routing within IMS

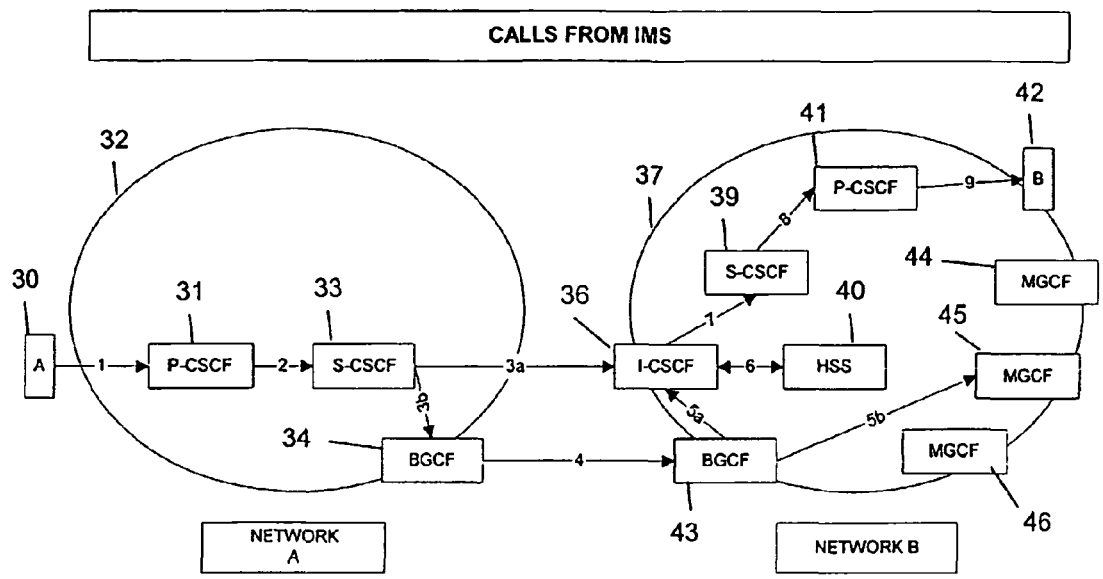

ROUTING with logical name:
1
2
S-CSCF find out that it is not E.164 but a logical name and gets FQDN of I-CSCF from the logical name.
3a
6
7
8
9

ROUTING with IMS E.164:
1
2
S-CSCF find out that it is E.164 and routes the call to a BGCF in the own network.
3b
4
BGCF in the target network finds out that it is IMS E.164 and routes the call to I-CSCF.
5a
6
7
8
9

ROUTING with non IMS E.164:
1
2
S-CSCF find out that it is E.164 and routes the call to a BGCF in the own network.
3b
4
BGCF in the target network finds out that it is not IMS E.164 and routes the call to one of the own MGCFs.
5b

FIG. 8

OPTIMIZED ROUTING BETWEEN COMMUNICATION NETWORKS

FIELD AND BACKGROUND OF THE INVENTION

The present invention relates to a system and method for routing messages and/or set of messages and/or sessions, in particular E.164 messages and/or set of messages and/or sessions (E.164 represents the international phone numbering system), to another network or operator. The other network is called foreign network, and the other operator foreign operator. In an E.164 message/session, the party/equipment originating the message/session indicates the E.164 number of the party/equipment to which the message/session is to be established.

A problem arises in routing messages and/or set of messages and/or sessions such as E.164 messages and/or set of messages and/or sessions to a foreign operator when one or more of the following three conditions are true concerning the foreign network and operator:

C1) The foreign operator uses the same number range for IMS (IMS=IP Multimedia Subsystem) and non-IMS e.g. CS (Circuit Switched) networks;

C2) Only individual—not all—customers of the foreign operator have subscribed both the non-IMS and IMS;

C3) The foreign operator does not allow to use its ENUM-DNS database (DNS=Domain Name System, ENUM is specified in RFC 2916 "E.164 number and DNS") via DNS delegation or as a copy for a trusted operator.

The task of the ENUM-DNS database is to give answer whether the target identifier, i.e. the E.164 number, is a valid IMS identity and if yes, give one or more NAPTR. There is not always a correct answer when E.164 belongs to the number range if non-IMS (e.g. GSM) and IMS number ranges overlap. In more detail, the ENUM-DNS database is used to answer the question Q1 "Is the target E.164 a valid IMS identity?" of S-CSCF (S-CSCF=Serving Call State Control Function) in the originating message and/or set of messages and/or session and to return one or more NAPTR (NAPTR=Naming Authority Pointer; RR of DNS; RR=Resource Record of DNS) if the answer is positive. With these NAPTR RRs the E.164 can be converted to a valid IMS routing address that is used to route the message and/or set of messages and/or session to the target network.

As mentioned above, there is not always a correct answer to the question "Q1" above when E.164 belongs to the number range in condition "C1".

ENUM-DNS then may return "not found", "domain unknown" or a similar result. This means that the E.164 number is not a valid IMS identity.

However, it may be that the E.164 number is actually a valid IMS identity but that this information cannot be obtained from the available ENUM-DNS in the originating network (i.e. condition "C3" is true). It can e.g. be obtained only in the trusted networks or possibly only in the target network itself. The answer in these cases is that the E.164 number may be a valid IMS identity.

According to the present IMS standard draft (3GPP TS 23.228 V.5.0.0) the message/session is routed to an own BGCF, and from there to an own MGCF or to a BGCF in the target network that routes the message/session further to a MGCF in the target network. From MGCF the message/session is routed to non-IMS e.g. CS network. If the E.164 message/session is a multimedia message/session that cannot be routed in non-IMS e.g. CS network, the message/session is released latest at MGCF in the own or in the target network.

Reasons of this problem are as follows. The normal way would be to utilize the hierarchical structure of DNS databases. This evidently was the original idea but it was not accepted as such in the standardization i.e. there is no global ENUM-DNS. Some operators are even reluctant to let the other operators see their IMS subscriber database i.e. ENUM-DNS database.

In the situation described above the "holes" in the ENUM-DNS database are non-IMS e.g. CS(CS=Circuit Switched) subscribers that have not yet become IMS subscribers.

In addition operators seem to be unwilling to publish not even information of the amount of the subscribers they have. That information (ENUM database and number of IMS subscribers) can easily be seen from ENUM-DNS if it is publicly available in the situation described above.

In such case, the message/session may be routed to an own BGCF (BGCF=Breakout Gateway Control Function), and from there to an own MGCF (MGCF=Media Gateway Control Function) or to a BGCF in the target network that routes the message/session further to a MGCF in the target network. From MGCF the message/session is routed to non-IMS e.g. CS network. If the E.164 session is a voice session, this is appropriate, and the called party gets a voice session to his non-IMS terminal e.g. to GSM mobile station.

If, however, the E.164 message/session is a multimedia message/session that cannot be routed in non-IMS e.g. GSM network, the message/session is released latest at MGCF in the own or in the target network.

SUMMARY OF THE INVENTION

According to one aspect, the invention provides a system as defined in the independent system claims or any one of the dependent system claims.

According to a further aspect, the invention provides a method as defined in the independent method claims or any one of the dependent method claims.

The invention provides a solution for routing messages and/or set(s) of messages and/or sessions depending on checked message/session requirements, e.g. media and/or QoS and/or other requirements of the message or the set of messages or the requested session.

The invention with all its embodiments and/or variations and/or combinations can be applied to messages and/or to sessions and also to messagesets, which are sets of messages that do not establish a session. A messageset contains one or more messages each with possible response message(s). An example of the messageset is the so called instant message that may carry multimedia content. Another example is the subscription of the presence information of another subscriber. The delivery of the presence information can be seen as part of the same messageset (especially if the delivery is done immediately and it utilizes the reverse route of the subscription) or it can be seen to build a separate messageset (especially when a change in the presence information is reported later or when the delivery is routed independently of the subscription).

BRIEF DESCRIPTION OF THE DRAWINGS

FIG. 6 shows utilized ENUM-DNS databases used at an originating BGCF, FIG. 8 illustrates an implementation for routing messages and/or messagesets and/or sessions which originate from IMS, wherein all E.164 messages and/or messagesets and/or sessions are routed via BGCF without ENUM query at originating S-CSCF.

DETAILED DESCRIPTION OF PREFERRED EMBODIMENTS OF THE INVENTION

Below, several solutions are proposed relating to the routing of message and/or messageset and/or session using E.164 number as identifier for identifying the terminal/subscriber to which the message and/or messageset and/or session is to established.

A basic solution includes the introduction of a routing chain S-CSCF-BGCF(o)-BGCF(t)-I-CSCF (o=originating; t=terminating). Local ENUM-DNS is used at an own originating S-CSCF to decide whether the E.164 is an IMS identity or not. A subset of the local ENUM-DNS database containing only the own IMS E.164 identities can be used also at an own terminating BGCF to make the same decision when accepting the terminating routing from terminating BGCF to I-CSCF.

A different ENUM-DNS database may be provided for routing at BGCF to an own MGCF or to a foreign i.e. terminating BGCF. So the following three ENUM-DNS databases are provided to manage all E.164 routing including special routing from terminating BGCF to I-CSCF: 1) ENUM-DNS database of own IMS E.164 identities; 2) ENUM-DNS database of IMS E.164 identities of the trusted operators (a part of these may be delegations to appropriate ENUM-DNS databases of respective operators following standard DNS principles); 3) ENUM-DNS database to find FQDN of the own MGCFs and foreign BGCFs (i.e. BGCFs of other operators/networks).

Some possible solutions S1) to S5) for handling messages and/or messagesets and/or sessions, in particular IMS messages and/or messagesets and/or sessions, to be routed to another network, are disclosed and discussed in the following.

S1) Release the message and/or messageset and/or session earlier, possibly already at the originating S-CSCF, S2) Route the message and/or messageset and/or session always as a normal IMS message and/or messageset and/or session, S3) Route the message and/or messageset and/or session according to the media and/or QoS and/or other requirements, S4) Create an additional route from target i.e. terminating BGCF to I-CSCF, S5) Use only one contact point type in the network.

The solution S1, "Release the message and/or messageset and/or session earlier", includes the following steps:

Check media and/or QoS and/or other requirements of the message/messageset/session;

if non-IMS e.g. CS network cannot route the message/messageset/session, release the message/messageset/session.

Checking could be done as early as in the originating S-CSCF, latest it should be done in the originating BGCF or MGCF.

This solution will lead to an early release of IMS messages and/or messagesets and/or sessions but will not support the routing of such messages and/or messagesets and/or sessions to the intended party/equipment.

Figure 1:
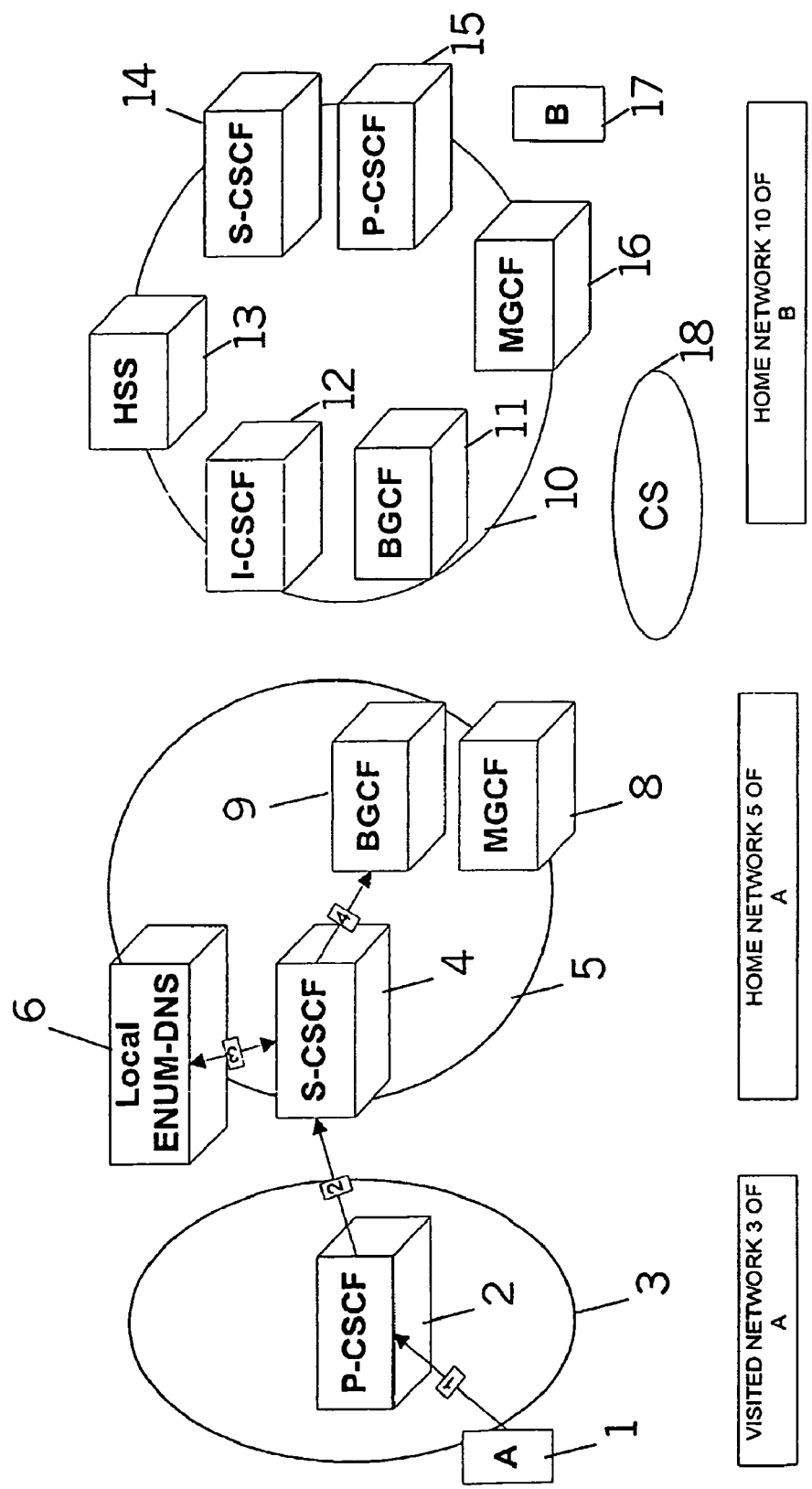
FIG. 1 shows a solution which will lead to an early release of IMS message and/or session.

FIG. 1 illustrates this solution S1). In the case shown in FIG. 1, a subscriber A 1 is attached to a visited network 3 which includes a P-CSCF 2. Network 5 is the home network of A, and includes a S-CSCF 4, a Local ENUM-DNS database 6, a MGCF 8, and a BGCF 9. Further, network 10 represents the home network of the called party/entity B 17. The network 10 includes a BGCF 11, an I-CSCF 12, a HSS 13, a S-CSCF 14, a P-CSCF 15, and a MGCF 16.

A Circuit-Switched (CS) network 18 is also available for handling connections.

The above and below description of the network elements/entities shown in FIG. 1 and their interrelationship is valid and applicable also for the further drawings unless otherwise described below.

In the following, the steps shown in FIG. 1 are described:

1) A message or session request message, e.g. SIP INVITE message, indicating the E.164 number of a called party B, e.g. +358-50-22112233 which may be E.164 of Radiolinja's IMS subscriber, is sent from user equipment A to P-CSCF 2 of the visited network 3 visited by (e.g. roaming) subscriber A.

2) The P-CSCF 2 of the visited network 3 sends the message/session request message, e.g. INVITE message, to the S-CSCF 4 of A subscriber's home network 5, indicating the E.164 number of the called party, +358-50-22112233.

3) The S-CSCF 4 of the home network 5 performs a local IMS ENUM-DNS 6 query indicating the E.164 number. When assuming that the local ENUM-DNS database 6 does not contain the called IMS subscriber, there will be, in this case, an "unknown domain", "not found" or alike response or no response at all from ENUM-DNS database 6.

4) The message/messageset/session is then released, or routed further from S-CSCF 4 to the BGCF 9 in the home network 5 where it is released. The message/messageset/session is released if the media, QoS or other requirement cannot be fulfilled in the non-IMS e.g. CS network carrying message/messageset/session to the target network. Checking requirements and releasing the message/messageset/session already in S-CSCF 4 avoids routing to MGCF 8 in vain.

Figure 2:
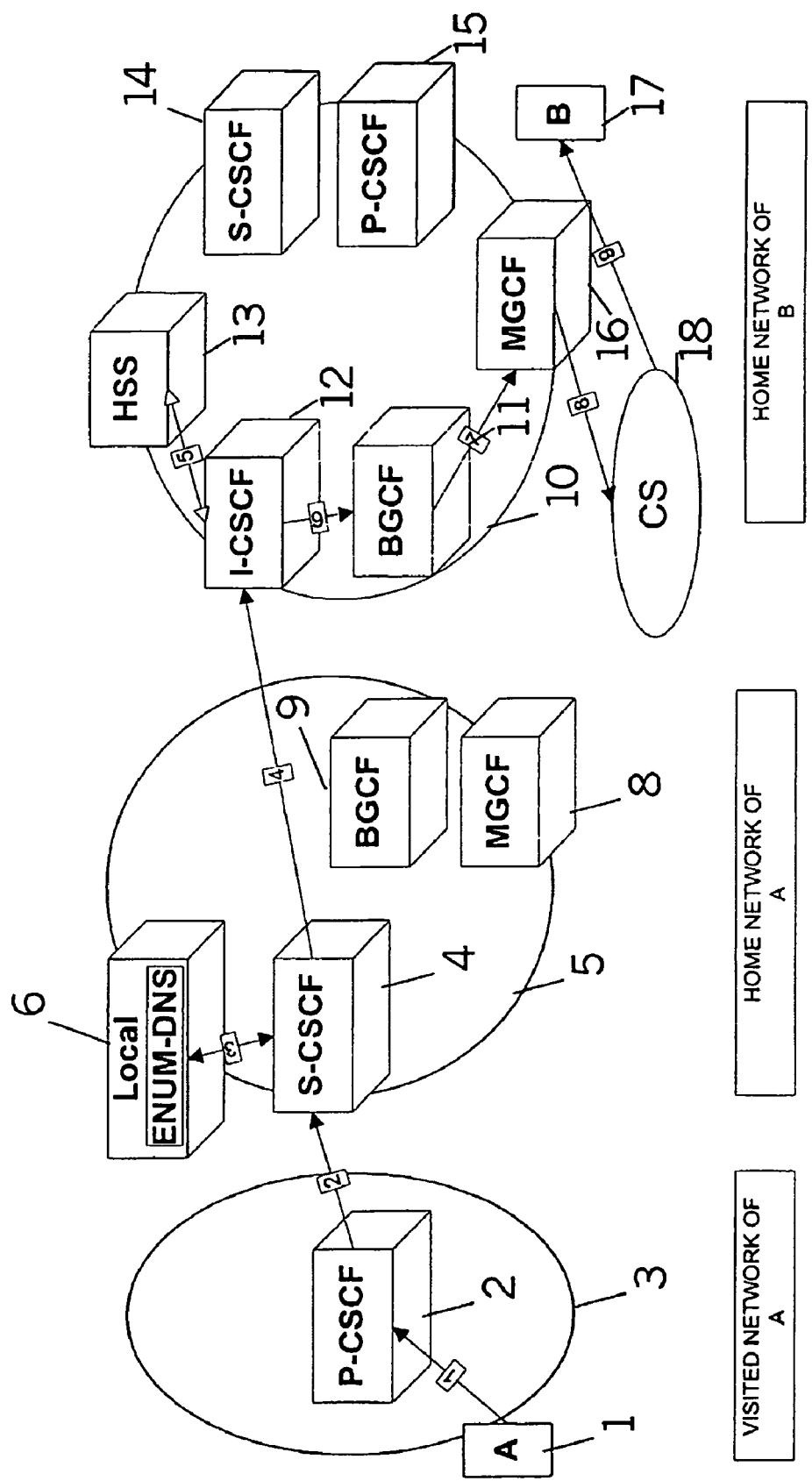
FIG. 2 illustrates an implementation where a message and/or messageset and/or session is always routed as a normal IMS message and/or session"

The solution S2, "Route the message and/or messageset and/or session always as a normal IMS message and/or messageset and/or session", is illustrated in FIG. 2, and includes the following steps:

Route all messages and/or messagesets and/or sessions from the originating S-CSCF 4 to the target I-CSCF 12 (I-CSCF=Interrogating Call State Control Function) of the network 10. The target operator of network 10 handles the message/messageset/session. If the message/messageset/session is a valid IMS message/messageset/session, it is routed normally as IMS message/messageset/session. If the message/messageset/session is not a valid IMS message/messageset/session, it is routed from I-CSCF 12 via BGCF 11 to MGCF 16, and possibly via non-IMS e.g. CS network 18, to entity 17. Thus, the routing is proper.

If the message and/or messageset and/or session is not a valid IMS message/messageset/session: the target operator may alternatively release the message/messageset/session and the originating operator of network 5 can reroute the message/messageset/session via an own BGCF 9.

This solution creates a new routing to route messages and/or messagesets and/or sessions from I-CSCF 12 via BGCF 11 to MGCF 16. In this case, the target operator has to handle a terminating non-IMS e.g. CS message/messageset/session at I-CSCF 12. An additional S-CSCF, e.g. a default S-CSCF for non-IMS subscribers, or alike can be used between I-CSCF 12 and BGCF 11.

FIG. 2 illustrates an example of an information flow according to solution S2. In this example, a HSS query (HSS=Home Subscriber Server), step 5, is involved, as shown in FIG. 2.

In the following, the steps shown in FIG. 2 are described:

1) A message or session request message, e.g. SIP INVITE message, indicating the E.164 number of a called party, e.g. +358-50-55223344 which may be E.164 of Radiolinja's non-IMS subscriber, is sent from user equipment A to P-CSCF 2 of the visited network 3 visited by (e.g. roaming) subscriber A.

2) The P-CSCF 2 of the visited network 3 sends a message/session request message, e.g. INVITE message, to the S-CSCF 4 of A subscriber's home network 5, indicating the E.164 number of the called party, +358-50-55223344.

3) The S-CSCF 4 of the home network 5 performs a local IMS ENUM-DNS query indicating the E.164 number. When assuming that the local ENUM-DNS database 6 does not contain the called subscriber, there will be, in this case, an "unknown domain", "not found" or alike response or no response at all from ENUM-DNS database 6 because the identity is a non-IMS identity.

4) The message/messageset/session is then routed further from S-CSCF 4 to the I-CSCF 12 in the home network 10 of subscriber B. The address of the I-CSCF 12 is fetched from routing database, which may be e.g. a routing table or an ENUM-DNS database specialized for routing similarly as the ENUM-DNS database 7 in FIG. 3.

5) The I-CSCF 12 performs a HSS 13 query using the E.164 number. The HSS 13 returns information that the E.164 is not an IMS identity. HSS 13 may return the address of BGCF 11 of the home network 10 of subscriber B. If a S-CSCF, e.g. for non-IMS subscribers, is used between I-CSCF 12 and BGCF 11, HSS may return its address.

6.) The message/messageset/session is then routed to the BGCF 11.

7) A message/session request, e.g. INVITE message is sent from BGCF 11 to MGCF 16 of network 10 of B, indicating the identity of B.

8) The MGCF 16 routes the message/messageset/session to CS network 18 which carries the message/messageset or establishes a session to Subscriber B (step 9).

One of the preferred solutions in accordance with embodiments of the invention is the solution S3).

Figure 3:
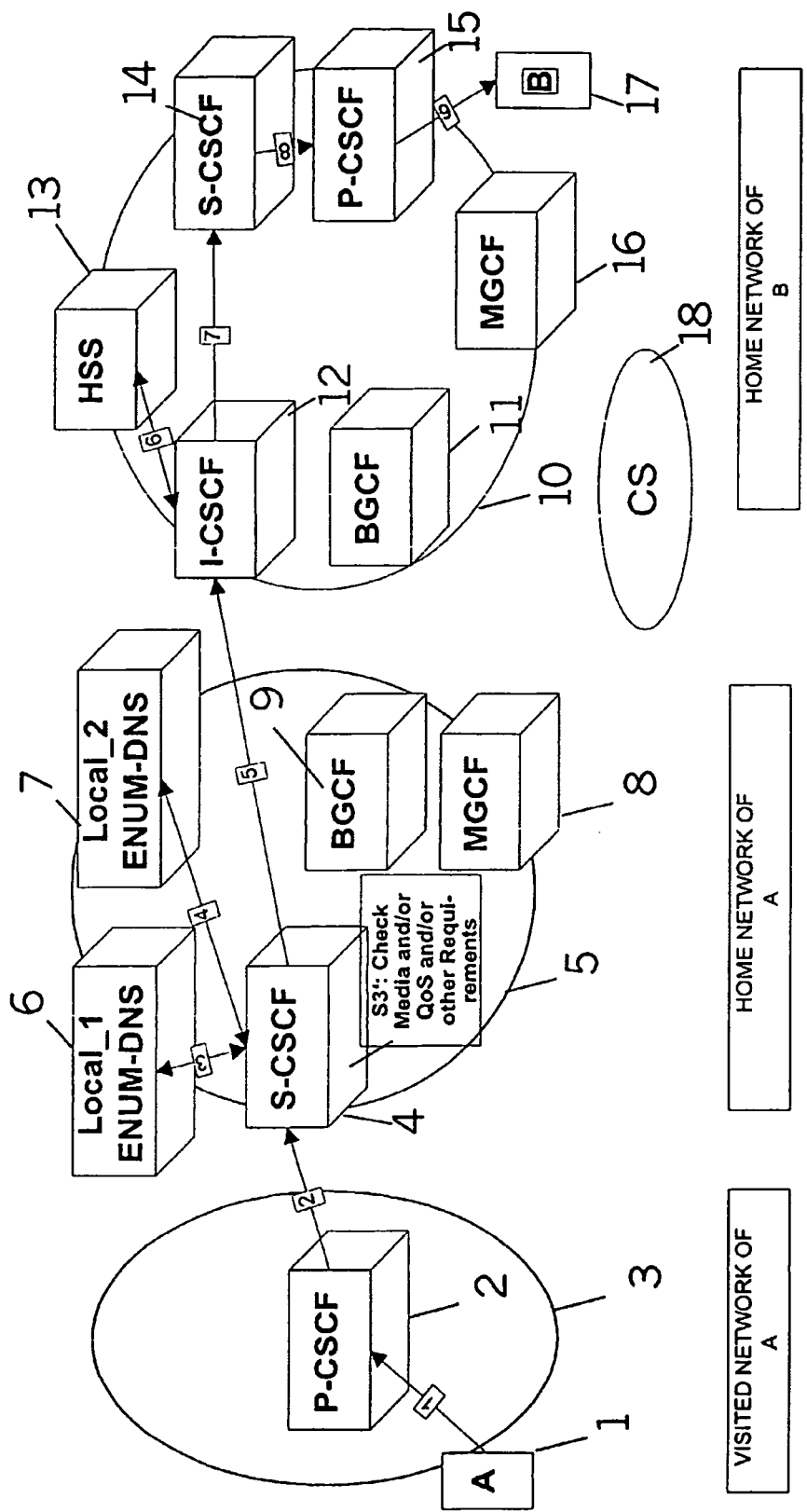
FIG. 3 illustrates an embodiment of the present invention which provides a solution "Route the message and/or messageset and/or session according to the media and/or QoS and/or other requirements"

An embodiment in accordance with the solution S3, "Route the message and/or messageset and/or session according to the media and/or QoS and/or other requirements", is shown in FIG. 3, and includes the following steps.

Check the media and/or QoS and/or other requirements of the messsage and/or messageset and/or session;
if non-IMS e.g. CS network could not route the message/messageset/session, the message/messageset/session has to be an IMS message/messageset/session and should be routed as such.

This checking is performed preferably in the home network 5 of A. The check can be done as early as in the originating S-CSCF 4, latest it should be done in BGCF 9.

An evaluation of the solution S3 shows that it is of advantage because multimedia IMS messages and/or messagesets and/or sessions are routed correctly to the target network.

Non multimedia, e.g. voice, messages and/or messagesets and/or sessions are routed to the called party via non-IMS e.g. CS network.

Checking media and/or QoS and/or other requirements is all that is needed.

FIG. 3 illustrates an example of an information flow according to solution S3. In this example, two local ENUM-DNS database 6, 7 are provided. The local ENUM-DNS database 6 preferably is a ENUM-DNS database containing IMS E.164 identities of subscribers to which the network 5 is the home network. The database 6 may also correspond to the local ENUM-DNS database 6 of FIG. 2, and may include the same or essentially the same content as the latter.

The local ENUM-DNS database 6 may include also IMS E.164 identities of the trusted operators. This part of the database may contain delegations to appropriate ENUM-DNS databases of respective operators following standard DNS principles. The database 7 includes an ENUM-DNS database containing information to find FQDN (FQDN=Fully Qualified Domain Name) of foreign I-CSCFs (i.e. I-CSCFs of other operators/networks). Instead of the database 6 other means may be used to help translating E.164 to corresponding routing address. Instead of the database 7 other means, e.g. routing tables, may be used to find address of foreign I-CSCFs.

A HSS query (HSS=Home Subscriber Server), step 6, is also involved, as shown in FIG. 3.

FIG. 3 illustrates an example of an information flow according to solution S3.

In the following, the steps shown in FIG. 3 are described:

1) A message or session request message, e.g. SIP INVITE message, indicating the E.164 number of a called party, e.g. +358-50-22112233 which may be E.164 of Radiolinja's IMS subscriber, is sent from user equipment A to P-CSCF 2 of the visited network 3 visited by (e.g. roaming) subscriber A.

2) The P-CSCF 2 of the visited network 3 sends a message or session request message, e.g. INVITE message, to the S-CSCF 4 of A subscriber's home network 5, indicating the E.164 number of the called party, +358-50-22112233.

3) The S-CSCF 4 of the home network 5 performs a local IMS ENUM-DNS query to the local ENUM-DNS database 6, indicating the E.164 number. When assuming that the local ENUM-DNS database 6 does not contain the called IMS subscribers, there will be, in this case, an "unknown domain", "not found" or alike response or no response at all from ENUM-DNS database 6.

3') Because no NAPTR resource records were received from ENUM-DNS database 6, the IMS identity is considered non-IMS identity. That is why the originating S-CSCF 4 checks the media requirements and/or QoS requirements and/or other requirements of the message/messageset/session by checking the information contained in the request received from P-CSCF 2 in order to decide whether the message/messageset/session can be routed through non-IMS (e.g. CS) network or whether it should be routed via IMS network.

4) When the message/messageset/session has to be routed via IMS network, the E.164 is regarded as an IMS identity. In order to route to the I-CSCF 12 the address of the I-CSCF 12 is needed. That is why the S-CSCF 4 of the home network 5 performs a local IMS ENUM-DNS query to the local ENUM-DNS database 7, indicating the E.164 number. Routing address to I-CSCF 12 is built with the help of NAPTR RRs received from the local ENUM-DNS database 7.

5) When the check of step 3') indicates that the message/messageset/session cannot be routed through non-IMS network, the message/messageset/session is then routed further from S-CSCF 4 to the I-CSCF 12 in the home network 10 of subscriber B.

6) The I-CSCF 12 performs a HSS 13 query using the E.164 number. The HSS 13 returns the address of S-CSCF 14 of the home network 10 of subscriber B.

7.) The message/messageset/session is then routed to the indicated S-CSCF 14.

8) A message/session request, e.g. INVITE message is sent from S-CSCF 14 to P-CSCF 15 of network 10 of B, indicating IMS identity of B.

9) The P-CSCF 15 routes the message/messageset/session to subscriber 17 so that the message/messageset is sent from A to B or session is established from A to B.

When the check performed in step 3') of FIG. 3 should indicate that the message/messageset/session need not to be routed via IMS network, the message/messageset/session may be routed via non-IMS network i.e. via BGCF 9, MGCF 8, and CS network 18, to entity 17.

Another one of the preferred solutions in accordance with embodiments of the invention is the solution S4).

Solution S4, "Create an additional route from target i.e. terminating BGCF to I-CSCF", includes the following steps.

a) Create a new routing from the target i.e. terminating BGCF 11 to I-CSCF 12 (1-CSCF=Interrogating Call State Control Function).
b) If the E.164 is a valid IMS identity, route from BGCF 11 to I-CSCF 12,
c) otherwise route as usual to a MGCF 16 (or 8).
d) If BGCFs 9, 11 drop themselves out, the routing is a normal IMS routing.

The routing is then: originating S-CSCF 4-->(I-CSCF 12)--> terminating S-CSCF 14.

The ENUM-DNS database can be utilized in BGCF 9 and/or 11 in making decision whether the E.164 is a valid IMS identity.

This solution S4 provides correct routing in all cases. An extra routing from BGCF 11 to I-CSCF 12 may be needed.

Figure 4:
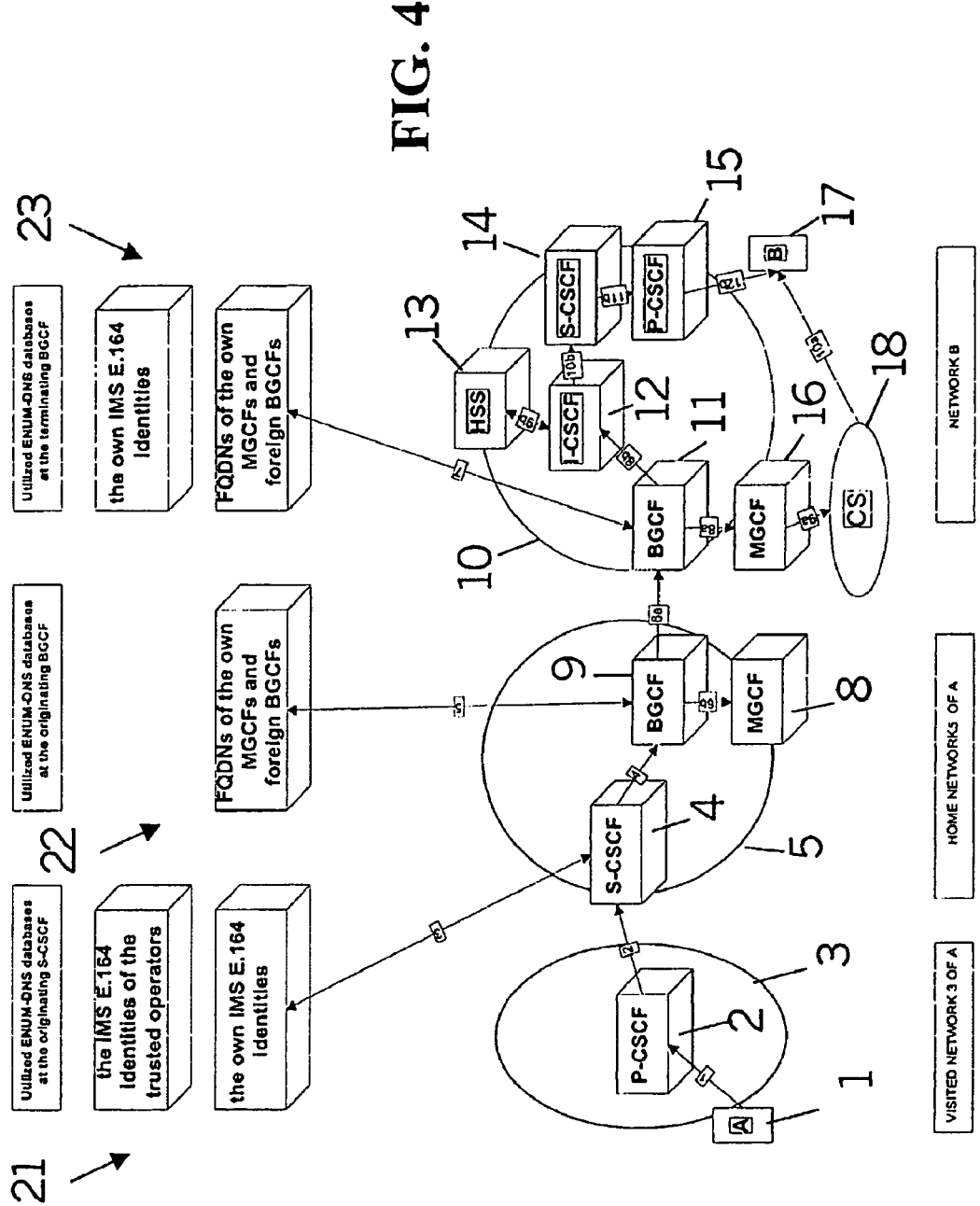
FIG. 4 illustrates an embodiment of the present invention which provides a solution "Create an additional route from target i.e. terminating BGCF to I-CSCF"

FIG. 4 illustrates an example of an information flow according to solution S4. In this example, the following conditions are assumed: Using E.164, originating a message and/or messageset and/or session by subscriber A, A subscriber's home network 5 is Sonera's network.

The embodiment of FIG. 4 provides three databases 21, 22, 23, for checking and finding IMS identities and FQDNs.

The database 21 is provided for network 5 and includes the own IMS E.164 identities as well as the IMS E.164 identities of the trusted operators. This database 21 is used by S-CSCF 4 of the network 5, for finding IMS identities of parties/terminals being identified by their E.164 numbers, in the message and/or session request message of step 2.

The database 22 is also provided for network 5 and includes the FQDNs of the own MGCFs, e.g. MGCF 8, and foreign BGCFs, e.g. BGCF 11. This database 22 is used by BGCF 9 of the network 5, for finding FQDNs used for routing to parties/terminals/networks/NEs (Network Elements) being identified by the E.164 numbers, in the message and/or session request message of step 4.

The database 23 is provided for network 10 and includes the own IMS E.164 identities as well as the FQDNs of the own MGCFs, e.g. MGCF 16, and foreign BGCFs, e.g. BGCF 9. This database 23 is used by BGCF 11 of the network 10, for finding IMS identities or FQDNs used for routing to parties/terminals/networks/NEs (Network Elements) being identified by the E.164 numbers, in the message and/or session request message of step 6a.

Description of the steps shown in FIG. 4:

1) A message or session request message, e.g. SIP INVITE message, indicating the E.164 number of a called party, e.g. +358-50-55223344 which is e.g. E.164 of Radiolinja's non-IMS subscriber, is sent to P-CSCF 2 of the visited network 3 visited by (e.g. roaming) subscriber A.

2) The P-CSCF 2 of the visited network sends a message or session request message, e.g. INVITE message, to the S-CSCF 4 of A subscriber's home network 5 (assumed to be Sonera's network), here with +358-50-55223344.

3) The S-CSCF 4 of the home network 5 performs a local IMS ENUM-DNS query to database 21 with 4.4.3.3.2.2.5.5.0.5.8.5.3.local_ims_enum.e164.ims.sonera.fi. When assuming that the local ENUM-DNS database 21 contains Radiolinja's IMS subscribers, there will be, in this case, an "unknown domain", "not found" or alike response or no response at all from ENUM-DNS database 21 because the identity is a non-IMS identity.

4) The message/messageset/session is routed further from S-CSCF 4 to the BGCF 9 in the own network 5.

5) The BGCF 9 performs a local routing ENUM-DNS query to database 22, with 4.4.3.3.2.2.5.5.0.5.8.5.3.local_routing_enum.e164.ims.sonera.fi. Local routing ENUM-DNS database 22 contains a NAPTR RR for each possible routing from BGCF 9.

The response returned to BGCF 9 is NAPTR that is used to get a valid IMS routing address. The result would be e.g. bgcf.ims.radiolinja.fi.

6a) The BGCF 9 of the home network 5 of A sends a message to BGCF 11 of the home network 10 of the called party or equipment B, e.g. INVITE with +358-50-55223344 and using bgcf.ims.radiolinja.fi as routing address.

6b) Alternatively, or additionally to step 6a), the BGCF 9 may send a message to the MGCF 8 of the home network 5 of A.

7) The BGCF 11 of network 10 of B performs an ENUM-DNS query to database 23, with 4.4.3.3.2.2.5.5.0.5.8.5.3.e164.ims.radiolinja.fi. ENUM-DNS database 23 contains one or more NAPTR RR for Radiolinja's IMS subscribers and one or more NAPTR for each possible routing from BGCF 11.

The response returned by database 23 to BGCF 11 is NAPTR that is used to get a valid IMS routing address. The result would be e.g. mgcf2.1 ms.radiolinja.fi because the identity is non-IMS identity.

8a) E.g. in case of a non-IMS message and/or messageset and/or session, a message or session request, e.g. INVITE message is sent from BGCF 11 to MGCF 16 of network 10 of B, indicating +358-50-55223344 and using mgcf2.1 ms.radiolinja.fi as routing address.

9a) The MGCF 16 routes the message/messageset/session to CS network 18 which carries a message/messageset or establishes a session to terminal 17 of Subscriber B (step 10a)).

8b) As an alternative to step 8a), preferably in case of an IMS message and/or messageset and/or session, a message or session request, e.g. INVITE message is sent to I-CSCF 12 of network 10 of B, indicating +358-50-55223344 and using icscf.ims.radiolinja.fi as routing address.

9b) The I-CSCF 12 performs a HSS inquiry. The HSS 13 returns the address of S-CSCF 14 assigned to subscriber B.

10b) The I-CSCF 12 sends a message or session request, e.g. INVITE message, to the S-CSCF 14 indicated in the HSS response.

11b) The S-CSCF 14 sends a message or session request, e.g. INVITE message, to the P-CSCF 15 assigned to subscriber B.

12b) The P-CSCF 15 sends a message/messageset or establishes the session to subscriber B.

Let us assume that Sonera (358-40) is the originating operator while Radiolinja (358-50) is the terminating operator. Radiolinja is a trusted operator of Sonera.

Figure 5:
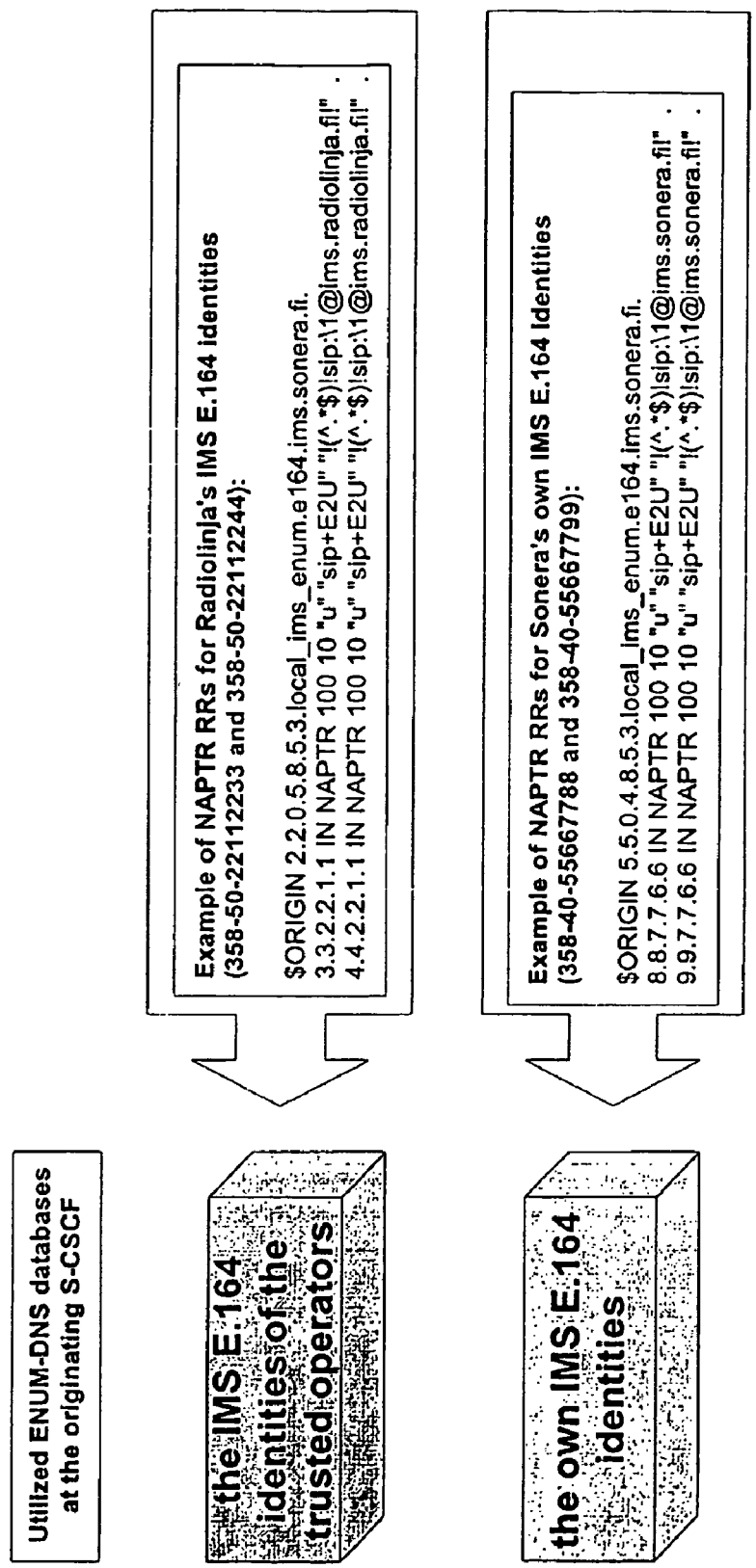
FIG. 5 illustrates an embodiment of the structure of utilized ENUM-DNS databases in accordance with an implementation of the present invention.
Figure 7:
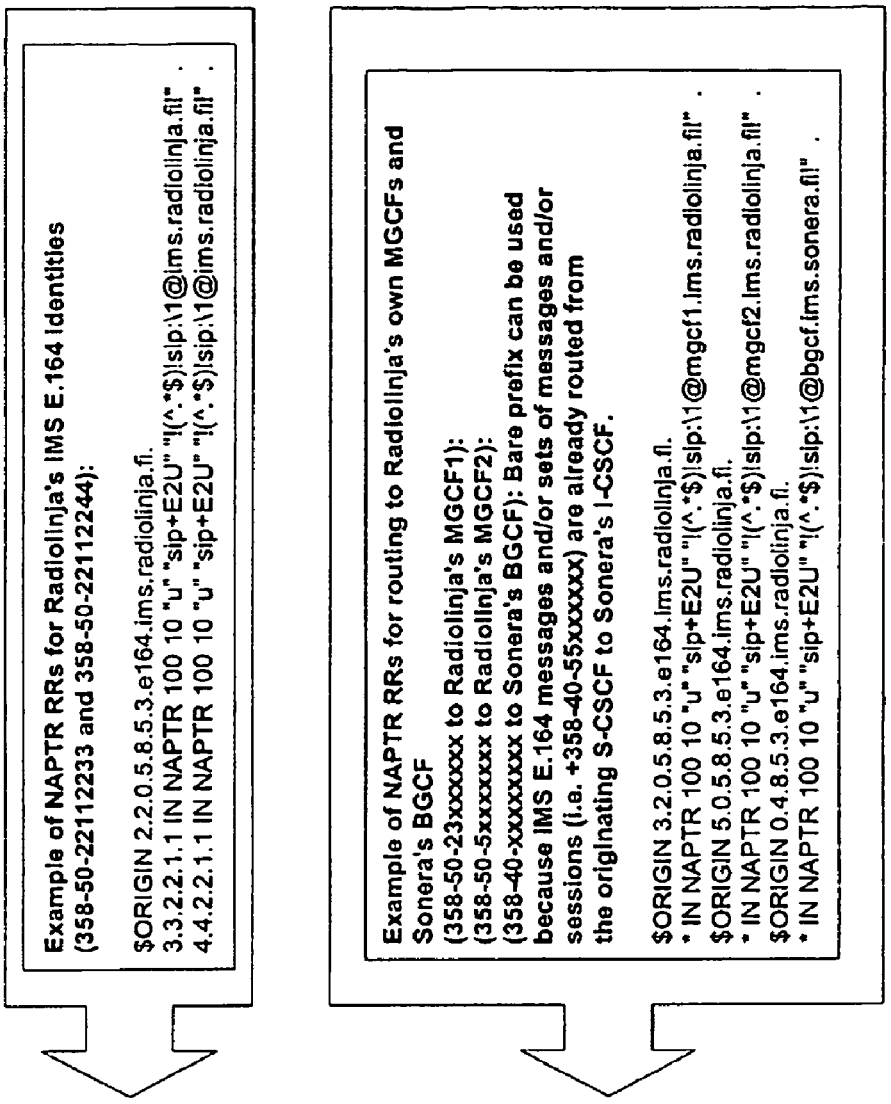
FIG. 7 shows utilized ENUM-DNS databases used at a terminating BGCF.

FIGS. 5 to 7 illustrate ENUM-DNS databases queries and response, as clearly shown and described in these drawings.

FIG. 5 shows the structure of utilized ENUM-DNS databases forming part of database 21 used at the originating S-CSCF 4.

An example of the database "IMS E.164 identities of the trusted operators", which contains NAPTR RRs for Radiolinja's IMS E.164 identities
(358-50-22112233 and 358-50-22112244) is:
$ORIGIN 2.2.0.5.8.5.3.local_ims_enum.e164.1 ms.sonera.fi.
3.3.2.2.1.1 IN NAPTR 100 10 "u" "sip+E2U"
"!(^.*$)!sip:\1@ims.radiolinja.fi!".
4.4.2.2.1.1 IN NAPTR 100 10 "u" "sip+E2U"
"!(^.*$)!sip:\1@ims.radiolinja.fi!".

An example of the database "own IMS E.164 identities", which contains NAPTR RRs for Sonera's own IMS E.164 identities:
(358-40-55667788 and 358-40-55667799):
$ORIGIN 5.5.0.4.8.5.3.local_ims_enum.e164.1 ms.sonera.fi.
8.8.7.7.6.6 IN NAPTR 100 10 "u" "sip+E2U"
"!(^.*$)!sip:\1@ims.sonera.fi!"
9.9.7.7.6.6 IN NAPTR 100 10 "u" "sip+E2U"
"!(^.$)!sip:\1@ims.sonera.fi!".

The databases are used to find out whether the E.164 is an IMS identity, and if it is, to get NAPTR to build a routable IMS identity.

The databases of the "own IMS E.164 identities" and the "IMS E.164 identities of the trusted operators" may be located under the same domain name like in the examples above (local_ims_enum.e164.ims.sonera.fi.) or under different domain names. In the first case normally one ENUM-DNS query is enough while in the second case both databases need an own query.

FIG. 6 shows the utilized ENUM-DNS databases of database 22 used at the originating BGCF 9.

An example of the database "FQDNs of the own MGCFs and foreign BGCFs", which contains NAPTR RRs for routing to
Sonera's own MGCFs and Radiolinja's BGCF:
(358-40-56xxxxxx to Sonera's MGCF1):
(358-40-4xxxxxxx to Sonera's MGCF2):
(358-50-xxxxxxxx to Radiolinja's BGCF): Bare prefix can be used because IMS E.164 messages/messagesets/sessions (i.e. +358-50-22xxxxxx) are already routed from the originating S-CSCF to Radiolinja's I-CSCF.
$ORIGIN
6.5.0.4.8.5.3.local_routing_enum.e164.ims.sonera.fi. *IN NAPTR 100 10 "u" "sip+E2U"
"!(^.*$)!sip:\1@mgcf1.ims.sonera.fi!".
$ORIGIN
4.0.4.8.5.3.local_routing_enum.e164.ims.sonera.fi. *IN NAPTR 100 10 "u" "sip+E2U".
"!(^.*$)!sip:\1mgcf2.1 ms.sonera.fi!".
$ORIGIN 0.5.8.5.3.local_routing_enum.e164.ims.sonera.fi.
*IN NAPTR 100 10 "u" "sip+E2U"
"!(^.*$)!sip:\1@bgcf.ims.radiolinja.fi!".

The database is used to find routing addresses.

FIG. 7 shows the utilized ENUM-DNS databases of database 23 used at the terminating BGCF 11.

An example of the database "own IMS E.164 identities", which contains NAPTR RRs for Radiolinja's IMS E.164 identities (358-50-22112233 and 358-50-22112244):
$ORIGIN 2.2.0.5.8.5.3.e164.ims.radiolinja.fi.
3.3.2.2.1.1 IN NAPTR 100 10 "u" "sip+E2U"
"!(^.*$)!sip:\1@ims.radiolinja.fi!".
4.4.2.2.1.1 IN NAPTR 100 10 "u" "sip+E2U"
"!(^.*$)!sip:\1@ims.radiolinja.fi!".

The database is used to find out whether the E.164 is an IMS identity, and if it is, to get NAPTR to build a routable IMS identity.

An example of the database "FQDNs of the own MGCFs and foreign BGCFs", which contains NAPTR RRs for routing to Radiolinja's own MGCFs and Sonera's BGCF
(358-50-23xxxxxx to Radiolinja's MGCF1):
(358-50-5xxxxxxx to Radiolinja's MGCF2):
(358-40-xxxxxxxx to Sonera's BGCF): Bare prefix can be used because IMS E.164 messages/messagesets/sessions (i.e. +358-40-55xxxxxx) are already routed from the originating S-CSCF to Sonera's I-CSCF.
$ORIGIN 3.2.0.5.8.5.3.e164.ims.radiolinja.fi.
*IN NAPTR 100 10 "u" "sip+E2U"
"!(^.*$)!sip:\1@mgcf1.ims.radiolinja.fi!".
$ORIGIN 5.0.5.8.5.3.e164.ims.radiolinja.fi.
*IN NAPTR 100 10 "u" "sip+E2U"
"!(^.*$)!sip:\1@mgcf2.1 ms.radiolinja.fi!".
$ORIGIN 0.4.8.5.3.e164.ims.radiolinja.fi.
*IN NAPTR 100 10 "u" "sip+E2U"
"!(^.*$)!sip:\1@bgcf.ims.sonera.fi!".

The database is used to find routing addresses.

The databases of the "own IMS E.164 identities" and the "FQDNs of the own MGCFs and foreign BGCFs" may be located under the same domain name like in the examples above (e164.ims.radiolinja.fi.) or under different domain names. In the first case normally one ENUM-DNS query is enough while in the second case both databases need an own query.

According to some of the embodiments of the invention, a terminating BGCF, e.g. BGCF 11, is able to route to I-CSCF. Further, some implementations describe how the ENUM databases are constructed and what kind of information they contain (3 different types). In another implementation of the invention, it is also possible to avoid the use of BGCFs.

In the following, further implementations of the invention will be described.

According to some of the embodiments of the invention, Local ENUM-DNS is used at an own originating S-CSCF to decide whether the E.164 is an IMS identity or not. A subset of the local ENUM-DNS database containing only the own IMS E.164 identities can be used also at an own terminating BGCF to make the same decision, provided that the terminating routing from terminating BGCF to I-CSCF is accepted. A different ENUM-DNS database is provided for routing at BGCF to an own MGCF or to a foreign i.e. terminating BGCF. Thus, only the following three ENUM-DNS databases are necessary to manage all E.164 routing including special routing from terminating BGCF to I-CSCF: 1) ENUM-DNS database of own IMS E.164 identities; 2) ENUM-DNS database of IMS E.164 identities of the trusted operators. A part of this database may be delegations to appropriate ENUM-DNS databases of respective operators following standard DNS principles. 3) ENUM-DNS database to find FQDN of the own MGCFs and foreign BGCFs (i.e. BGCFs of other operators/networks).

Basically, for routing of E.164, BGCF was proposed to take care of the E.164 routing. However no clear means are standardized for the routing at BGCF.

Routing from a terminating BGCF to I-CSCF is beneficial. If routing via several BGCFs is also allowed, the ENUM-DNS database used at the terminating BGCF may be the same as at the originating BGCF.

The following is a short introduction to the local ENUM-DNS problem: ENUM-DNS used at the originating S-CSCF is local according to present published proposals. It means that it contains DNS NAPTR resource records (RR) only for the operator's own IMS subscribers and for the IMS subscribers of trusted operators. The trusted operators might e.g. be operators acting in the same country, partly owned operators or operators belonging to the same alliance. If the operator allows a non-IMS e.g. CS subscriber to keep the same E.164 identity when he becomes an IMS subscriber, and all subscribers do not become IMS subscribers at the same time, the operator is obliged to have in the ENUM-DNS database in principle a NAPTR RR for every non-IMS e.g. CS subscriber that has become an IMS subscriber. The ENUM-DNS database evidently becomes a huge database. To copy such databases from one operator to another is not easy. Depending on the frequency the database is copied it may lack information of many new IMS subscribers.

The normal way to avoid copying would be to utilize the hierarchical structure of DNS databases. This way was not accepted in the standardization, because some operators are reluctant to let the other operators see their IMS subscriber database i.e. ENUM-DNS database. In the situation described above the "holes" in the database are non-IMS e.g. CS subscribers that have not yet become IMS subscribers and thus would be potential target for competitors' marketing actions. In addition operators seem to be unwilling to publish not even information of the amount of the subscribers they have. That information (ENUM database and number of IMS subscribers) can easily be seen from ENUM-DNS if it is publicly available in the situation described above.

Some of the advantages of the proposed solutions, in particular the solutions as shown in FIGS. 4 to 7, are:
a) Simple structure and functioning.
b) Because no routing data is automatically exchanged between operators, there are no severe security problems like with TRIP (TRIP=A Framework for Telephony Routing over IP (RFC 2871)) (if TRIP is used as automatic routing data exchange method between operators).
c) One simple routing method and tool for all E.164 routing.
d) Operators do not need to reveal the content of their ENUM-DNS databases to other operators.
e) Reuses the existing ENUM-DNS database in TS 23.228 to create a new routing feature from terminating BGCF to I-CSCF.
f) Valid method to route from originating BGCF to a foreign I-CSCF.
g) BGCF can be used as a "transit exchange" for MGCFs/MSSs (i.e. MSC servers) or alike. Economical solution because BGCF drops itself out after the first message of the session or messageset is processed.
h) Possible to utilize only a local routing database, which doesn't contain addresses of all BGCFs of all other networks but only addresses of BGCFs in the near located networks. This way the standalone message(s) and/or the first message of the session/messageset possibly hops through several BGCFs in several networks and records the correct route for subsequent messages. BGCF drops itself out from the route for subsequent messages.

FIGS. 4 to 7 describe and show the relation of the different ENUM-DNS databases with a flow example.

E.g. a regular expression field or other fields of NAPTR RR, or fields of SRV RR(SRV=a DNS RR for specifying the location of services (DNS SRV)) can be used to store attributes if needed. (SRV RRs are referred with the result of operation specified with NAPTR RR).

Both methods below can be utilized.

In an implementation method 1: The same input file (e.g. the own IMS E.164 identities) is loaded two times to build DNS databases for two different zones/domains.

Implementation method 2: Needed input files are appended/merged to build one input file that is used to build DNS database for a certain zone/domain.

One of the main ideas of this implementation of the invention is to use a single method (i.e. ENUM-DNS) for all E.164 routing by combining the existing ENUM-DNS database in TS 23.228 with a new ENUM-DNS database to create a complete routing method for E.164. And to reuse the existing ENUM-DNS database in TS 23.228 to create a new routing feature: routing from terminating BGCF to I-CSCF.

In accordance with some embodiments of the invention, two paths to a foreign network may be provided: the first path via I-CSCF and the second via BGCF.

FIG. 8 shows an embodiment providing such two transmission paths. Home network 32 of subscriber A 30 contains a P-CSCF 31, a S-CSCF 33, and a BGCF 34. Home network 37 of subscriber B 42 contains a I-CSCF 36, a P-CSCF 41, a S-CSCF 39, a BGCF 43, a HSS 40, and several MGCFs 44, 45, 46.

An idea of the implementation of the invention in accordance with the embodiment shown in FIG. 8 is to route all E.164 messages and/or messagesets and/or sessions via BGCF 34 and non-E.164 messages and/or messagesets and/or sessions via I-CSCF 36.

In the explaining texts of the FIG. 8 only call is mentioned as an example of message, messageset and session.

In the embodiment of FIG. 8, all E.164 messages and/or messagesets and/or sessions are routed via BGCF without ENUM query at originating S-CSCF.

According to this principle E.164 messages and/or messagesets and/or sessions are routed directly to an own BGCF 34 without ENUM-DNS query or any other analysis in S-CSCF 33. From the own BGCF 34 the message and/or messageset and/or session is routed to a BGCF 43 in the target network 37. That BGCF 43 analyzes the E.164 and decides whether to route the message and/or messageset and/or session to I-CSCF 36 or to one of the own MGCFs 44 to 46 or possibly to a BGCF in another network. A routing database, which is obtained e.g. with TRIP protocol (TRIP=A Framework for Telephony Routing over IP (RFC 2871)), can be used as the basis for decisions where to route the messages and/or messagesets and/or sessions at BGCF 43 as well as at BGCF 34. The routing database may also be e.g. a routing table or an ENUM-DNS database like databases 23 and 22 of FIG. 4.

The routing with different identifiers (Logical name; IMS E.164 number; non-IMS E.164 number) identifying the terminating, e.g. called entity is explained below, the step sequence being in accordance with the step numbering shown in FIG. 8.

FIG. 8 deals with a case where messages and/or messagesets and/or sessions, e.g. calls originate from IMS. The messages and/or messagesets and/or sessions, e.g. calls originating from IMS may include logical name, IMS E.164 number, or non-IMS E.164 number, as an identifier for identifying the called party or terminal.

Routing with Logical Name:

As shown in FIG. 8, when A 30 is originating a message and/or messageset and/or session, a message including the logical name is sent to P-CSCF 31 (step 1) in the customary manner which transmits a message to S-CSCF 33 (step 2). S-CSCF 33 detects that the message contains no E.164 number but the logical name, and gets FQDN of I-CSCF 36 from the logical name. The S-CSCF then routes the message/messageset/session to the I-CSCF 36 of network 37 (step 3a). The I-CSCF 36 performs a HSS 40 query (step 6) using the logical name received from the S-CSCF 33, and routes the message/messageset/session according to the information received from HSS 40, via S-CSCF 39 (step 7), P-CSCF 41 (step 8) to the called party terminal/entity B 42 (step 9).

Routing with IMS E.164:

As shown in FIG. 8, when subscriber or entity A 30 is originating a message and/or messageset and/or session, a message including the E.164 number is sent to P-CSCF 31 (step 1) in the customary manner which transmits a message (step 2) including this identifier to S-CSCF 33. S-CSCF 33 detects that the message contains E.164.number, and routes the message/messageset/session to BGCF 34 of own network 32 (step 3b). The BGCF 34 forwards the message/messageset/session, e.g. call, to the BGCF 43 of network 37 (step 4). BGCF 43 detects that the message contains IMS E.164.number, and routes the message/messageset/session to I-CSCF 36 (step 5a). The I-CSCF 36 performs a HSS query using the IMS E.164 number received from the BGCF 43 (step 6), and routes the message/messageset/session according to the information received from HSS, via S-CSCF 39 (step 7), P-CSCF 41 (step 8) to the called party terminal/entity B 42 (step 9).

Routing with Non-IMS E.164:

As shown in FIG. 8, when A 30 is originating a message and/or messageset and/or session, a message including the E.164 number is sent to P-CSCF 31 (step 1) in the customary manner which transmits a message including this identifier to S-CSCF 33 (step 2). S-CSCF 33 detects that the message contains E.164.number, and routes the message/messageset/session to BGCF 34 of own network 32 (step 3b). The BGCF 34 forwards the message/messageset/session, e.g. call, to the BGCF 43 of network 37 (step 4). BGCF 43 detects that the message contains non-IMS E.164.number, and routes the message/messageset/session (step 5b) to one of the MGCFs 44, 45, or 46.

Figure 9:
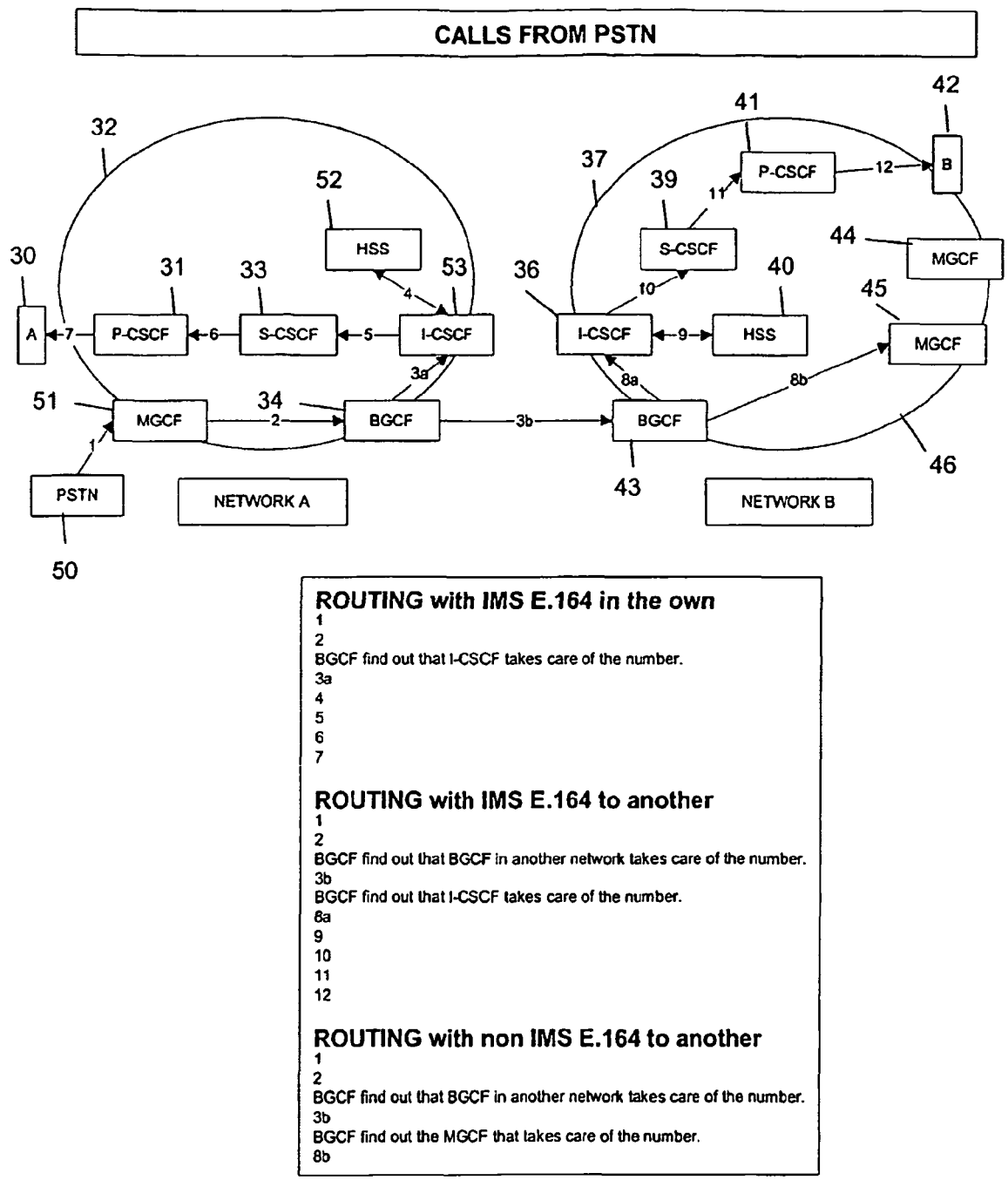
FIG. 9 shows an implementation of the invention similar to the structure of FIG. 8, wherein all E.164 messages and/or messagesets and/or sessions are routed via BGCF without ENUM query at originating S-CSCF.

FIG. 9 shows an implementation of the invention similar to the structure shown in FIG. 8. The same reference numerals indicate the same components as in FIG. 8. FIG. 9 additionally shows a non-IMS network e.g. PSTN 50 originating a message and/or messageset and/or session, e.g. call, a MGCF 51, a HSS 52, and an I-CSCF 53, each provided in network 32.

In the embodiment of FIG. 9, similar to the embodiment of FIG. 8, all E.164 messages and/or messageset and/or sessions are routed via BGCF without ENUM query at originating S-CSCF.

A routing database, which is obtained e.g. with TRIP protocol (TRIP=A Framework for Telephony Routing over IP (RFC 2871)), can be used as the basis for decisions where to route the messages and/or messagesets and/or sessions at BGCF 43 as well as at BGCF 34. The routing database may also be e.g. a routing table or an ENUM-DNS database like databases 23 and 22 of FIG. 4.

As a first example, a case is considered where routing is required in subscriber's home network 32 to subscriber A 30 as terminating terminal, with IMS E.164 number being indicated in the message and/or messageset and/or session initiating message sent from non-IMS network e.g. PTSN 50.

As shown in FIG. 9, when a party or terminal of the non-IMS network e.g. PSTN 50 intends to initiate a message and/or messageset and/or session, e.g. originate a call, it sends a message (step 1) to the MGCF 51 which forwards the message to the BGCF 34 (step 2). The BGCF 34 detects from the received identifier, i.e. IMS E.164 number, which I-CSCF 53 is taking care, and forwards the message to the I-CSCF 53 (step 3a). The I-CSCF 53 performs a HSS 52 query using the IMS E.164 number (step 4), and receives information on the S-CSCF 33 to be used. The I-CSCF 53 addresses S-CSCF 33 indicating the identifier (step 5) which forwards the message/session request via P-CSCF 31 (step 6) to the terminal A 30 (step 7) as a message or for establishing the session.

In a second example, a case is considered where routing is required to another network 37 to terminal B 42 as a terminating terminal, with IMS E.164 number being indicated in the message and/or messageset and/or session initiating message sent from non-IMS network e.g. PTSN 50.

As shown in FIG. 9, when a party or terminal of the non-IMS network e.g. PSTN 50 intends to initiate a message and/or messageset and/or session, e.g. originate a call, it sends a message (step 1) to the MGCF 51 which forwards the message to the BGCF 34 (step 2). The BGCF 34 detects from the received identifier, i.e. IMS E.164 number, that BGCF 43 of network 37 is taking care of the number, and forwards the message to the BGCF 43 (step 3b). The BGCF 43 detects from the received identifier, i.e. IMS E.164 number, which I-CSCF 36 of network 37 is taking care of the number, and forwards the message to the I-CSCF 36 (step 8a). The I-CSCF 36 performs a HSS 40 query using the IMS E.164 number (step 9), and receives information on the S-CSCF 39 to be used. The I-CSCF 36 addresses S-CSCF 39 indicating the identifier (step 10) which forwards the message/session request via P-CSCF 41 (step 11) to the terminal B 42 (step 12) as a message or for establishing the session.

As a third example, a case is considered where routing is required to another network 37 and further to a terminal in a non-IMS network as a terminating terminal, with non-IMS E.164 number being indicated in the message and/or messageset and/or session initiating message sent from non-IMS network e.g. PTSN 50.

As shown in FIG. 9, when a party or terminal of the non-IMS network e.g. PSTN 50 intends to initiate a message and/or messageset and/or session, e.g. originate a call, it sends a message (step 1) to the MGCF 51 which forwards the message to the BGCF 34 (step 2). The BGCF 34 detects from the received identifier, i.e. non-IMS E.164 number, that BGCF 43 of network 37 is taking care of the number, and forwards the message to the BGCF 43 (step 3b). The BGCF 43 detects from the received identifier, i.e. non-IMS E.164 number, which MGCF 45 of network 37 is taking care of the number, and forwards the message to the MGCF 45 (step 8b). The MGCF 45 executes the necessary steps for sending the message/messageset to or establishing the session with the called party.

A first problem solved by these and other implementations of the invention is the routing without ENUM-DNS.

It is impossible to know before HSS query has been done whether E.164 is or is not an IMS number. ENUM-DNS is used as a method to solve this problem.

However ENUM-DNS databases are huge databases. They are needed only to find out whether the E.164 is an IMS number (corresponding NAPTR resource record is found in ENUM-DNS) or not (corresponding NAPTR resource record is not found). Building and administration of the ENUM-DNS database is a huge task. And it can be easily imagined that the global ENUM-DNS hierarchy will never become totally complete. It is questionable whether it is worth of the effort to build ENUM-DNS databases just to get the information whether the E.164 is an IMS number or not. Routing with E.164 can easily be separated from the functionality of the CSCFs and handled in a specialized NE i.e. BGCFs. Hence it is possible to avoid the use of ENUM-DNS so as to solve the above problem.

A second problem solved by these and other implementations of the invention is a situation when ENUM-DNS is not available at the moment, or not at all, or the needed part in the hierarchy of ENUM-DNS is not available at the moment or not at all (e.g. the access path to the ENUM-DNS database is congested, the database has crashed, too long delay, etc).

When ENUM-DNS information concerning the E.164 is not available, the message and/or messageset and/or session has to be routed from the originating S-CSCF to an own BGCF. The BGCF routes the message/messageset/session to a BGCF in the target network. That BGCF has to route the message/messageset/session to I-CSCF if the E.164 is an IMS number, otherwise to MGCF.

Figure 10:
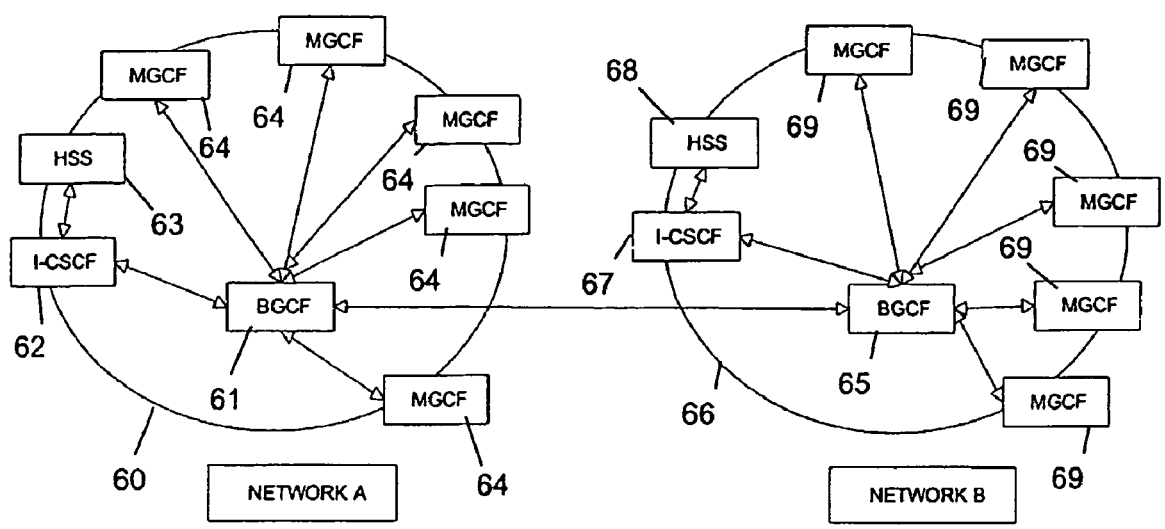
FIG. 10 shows an embodiment of the invention wherein a BGCF serves as transit exchange.

FIG. 10 shows an embodiment wherein the problem of "Transit exchange" is solved. A BGCF serves as transit exchange.

Some operators like to have a network element (NE) that can route traffic via IP network between non-IMS network elements, e.g. Mobile Switching Centers (MSCs), IP trunks, MSC servers, connected to IMS network e.g. via MGCFs like in the FIG. 10. In this embodiment, a BGCF is provided for routing such traffic.

A network 60 shown in FIG. 10 comprises a BGCF 61 serving as traffic exchange. The BGCF 61 is able to communicate with other network elements (I-CSCF 62, a plurality of MGCFs 64, etc) of the network 60 such as indicated by double-headed arrows. Thus, the BGCF 61 can work as a transit exchange between the network elements of network 60. Further, the BGCF is able to communicate with a BGCF 65 of network 66. Similar to the structure of network 60, the BGCF 65 of network 66 can communicate with other network elements (I-CSCF 67, a plurality of MGCFs 69, etc) of the network 66 such as indicated by double-headed arrows. Thus, the BGCF 65 can work as a transit exchange between the network elements of network 66. The I-CSCFs 62, 67, are able to query HSSs 63, 68, resp., if necessary. Hence, the BGCF can be used as a transit exchange for solving the above problem.

Figure 11:
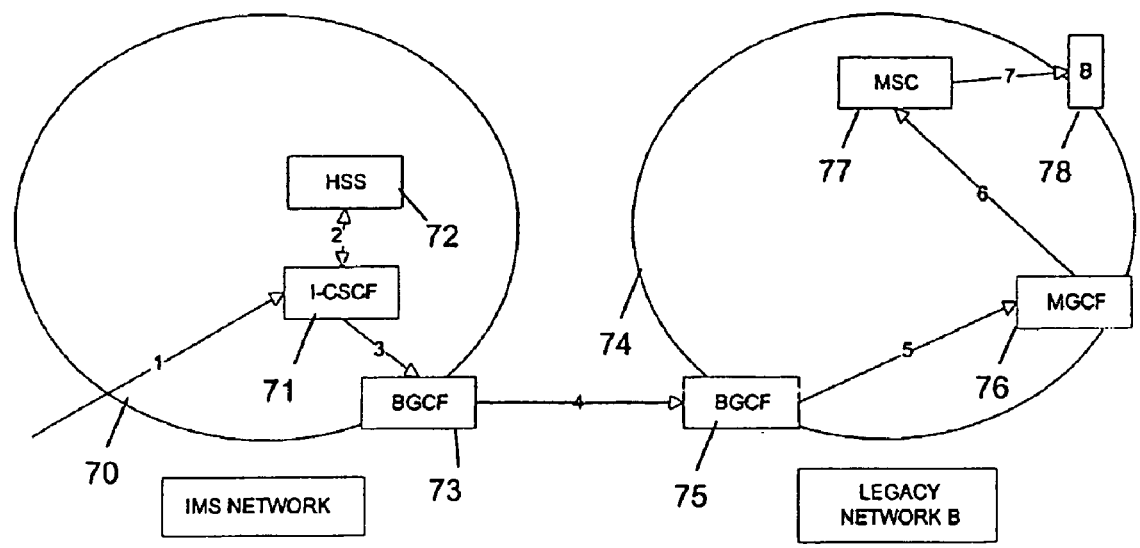
FIG. 11 shows an embodiment which provides routing to a subscriber roaming in a legacy network.

The embodiment of FIG. 11 provides a solution to problems which may arise when a subscriber, in particular an IMS subscriber is roaming in a non-IMS e.g. legacy network. When, finding out after Location request to HSS, that a subscriber, e.g. IMS subscriber B 78, is roaming in a non-IMS e.g. legacy network, e.g. network 74, the invention provides a possibility of how the message and/or messageset and/or session e.g. call is routed to the legacy network 74 from I-CSCF 71 of IMS network 70.

When a call or other type of message or messageset or session is to be routed to IMS subscriber B 78, the message/messageset/session e.g. a call is first routed to I-CSCF 71 of the home network 70 of subscriber B 78 (step 1). After HSS 72 query (step 2), the I-CSCF 71 is informed that the called subscriber is presently roaming in non-IMS e.g. legacy network 74, and routes the message/messageset/session e.g. call to BGCF 73 of network 70 (step 3). The BGCF 73 routes the message/messageset/session e.g. call to BGCF 75 of network 74 (step 4) or alternatively directly to MGCF 76 of network 74. The BGCF 75 forwards the message/messageset/session e.g. call to MGCF 76 of network 74 (step 5) which routes the call to MSC 77 (step 6) and from there to the subscriber 78. Hence, routing from I-CSCF 71 to an own BGCF 73 solves the above problem. If a S-CSCF, e.g. for non-registered or roaming IMS subscribers, is used between I-CSCF 71 and BGCF 73, I-CSCF 71 routes to the S-CSCF and the S-CSCF routes to BGCF 73.

Advantages of the above embodiments of the invention include: Clear routing: E.164 and logical names (e.g. john.smith@ims.sonera.fi) can have both their own separate routing path until the target network. Further, if I-CSCF on the border does not work messages and/or messagesets and/or sessions e.g. calls can be routed via BGCF and vice versa.

In accordance with one of the preferred implementations of the invention, providing the possibility of using routing "via I-CSCF" and "via BGCF" as two alternative paths between networks, the implementation allows to route the messages and/or messagesets and/or sessions e.g. calls from I-CSCF to BGCF and vice versa in order to change from one path to another.

The implementations according to the invention may be used as a solution for example to transit exchange, and maybe also as a solution to roaming.

These embodiments of the invention, e.g. as shown in FIGS. 8 to 11, allow to route E.164 and logical names separately and without any help of ENUM-DNS databases and allows routing between I-CSCF and BGCF (in the same network) to both directions.

A routing database, which is obtained e.g. with TRIP protocol (TRIP=A Framework for Telephony Routing over IP (RFC 2871)), can be used as the basis for decisions where to route the messages and/or messagesets and/or sessions at BGCF 65 and 75 as well as at BGCF 61 and 73. The routing database may also be e.g. a routing table or an ENUM-DNS database like databases 23 and 22 of FIG. 4.

In accordance with some of the preferred embodiments of the invention, a new border element or functionality, let it be called DGCF i.e. Dividing Gateway Control Function, is provided which takes care of all incoming traffic from foreign IP multimedia networks. It divides the traffic to I-CSCFs and to BGCFs and may take care of the load sharing and/or balancing. It may handle the hiding i.e. encrypts/decrypts the name of the own S-CSCF if topology hiding is required. DGCF may contain address analysis e.g. digit analysis or query to local ENUM-DNS to decide the target network element. Different number ranges may be used for IMS and non-IMS subscribers to make it easy for DGCF to choose the routing to I-CSCF or to BGCF respectively. DGCF may also contain firewall functionality because it is the contact point of the network.

The introduction of BGCF increases the amount of contact points in the network, possibly doubles it. Because ENUM seems to remain local, at least in the beginning, there is no universal way to know whether the certain E.164 of a foreign network is an IMS number or not, i.e. should it be routed to I-CSCF or BGCF of the foreign network. Therefore the division is artificial and the result might be that all E.164 messages and/or messagesets and/or sessions e.g. calls are routed to a BGCF in the target network. That BGCF should check the E.164 and decide whether it is an IMS number or not. That is one of the reasons why the separation of E.164 numbers of a foreign network cannot be done correctly in the originating network. If this separation is not done in the originating network, there is a problem where to route the message and/or messageset and/or session e.g. the call in the target network: to I-CSCF or to BGCF. Using DGCF in the target network this problem is solved.

Figure 12:
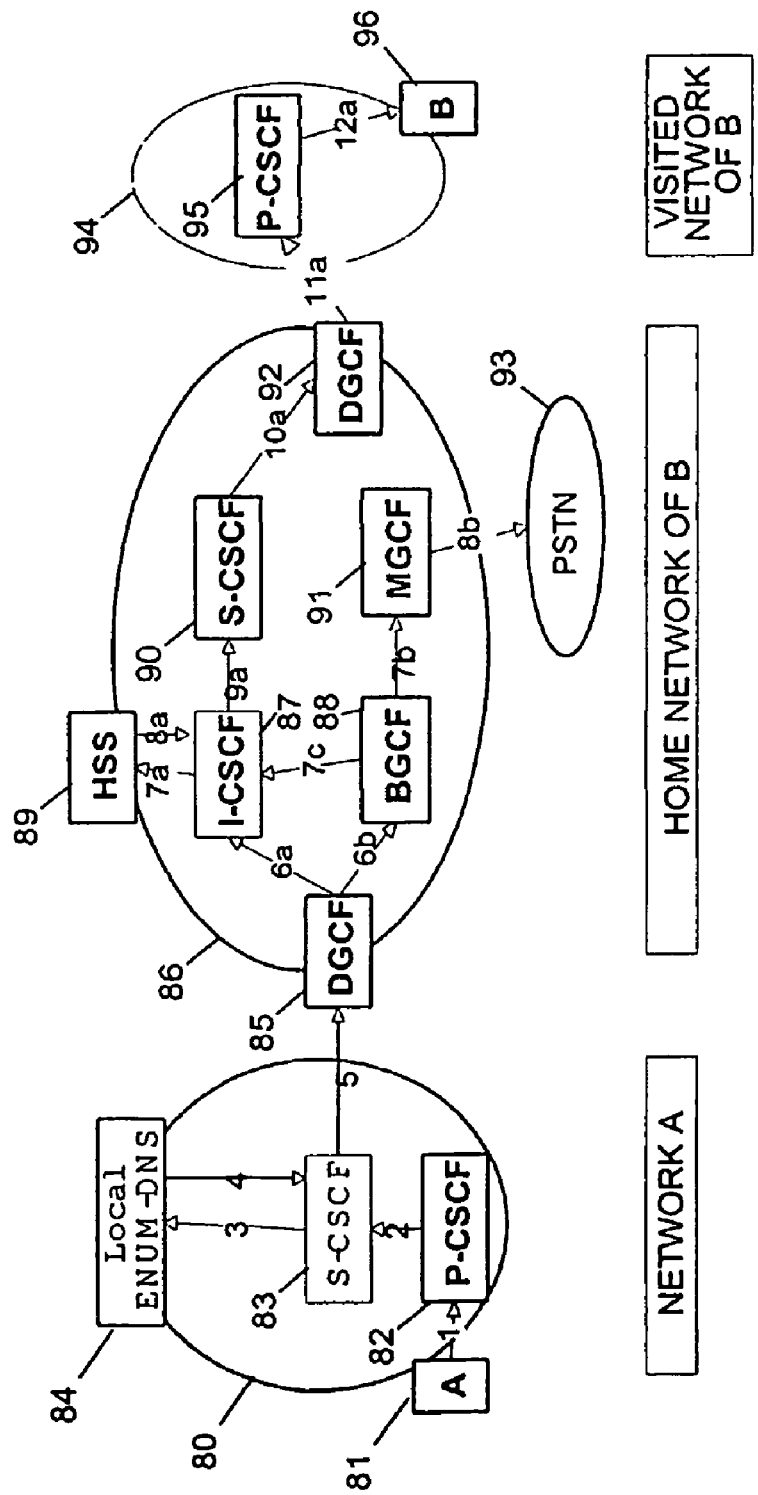
FIG. 12 shows embodiments for explaining routing examples for routing messages and/or messagesets and/or sessions such as calls from one to another equipment.

FIG. 12 illustrates an embodiment incorporating the new network element(s) DGCF.

The embodiment of FIG. 12 illustrates some examples where a message and/or messageset and/or session request, e.g. a call, originating from a subscriber A 81 is directed to a subscriber B 96 which is presently roaming outside of its home network 86 in a visited network 94 which includes a P-CSCF 95. Home network 80 of subscriber A includes a P-CSCF 82 receiving the message and/or session request from subscriber A (step 1) which forwards the message or session request to a S-CSCF 83 (step 2). The S-CSCF 83 performs a query to a database (Local ENUM-DNS) 84 (steps 3, 4) in case E.164 is used as identity of B subscriber.

A routing database, e.g. routing table or ENUM-DNS, may be used to find routing address of DGCF when E.164 is used as identity.

The home network 86 of subscriber B includes one or more DGCFs 85, 92. Further, the network 86 includes customary components such as I-CSCF 87, BGCF 88, HSS 89, S-CSCF 90, and MGCF 91.

The other networks may also incorporate one or more DGCFs.

FIG. 12 shows some routing examples for routing message and/or messageset and/or session such as calls from subscribers A to B.

In a first routing example, the message and/or messageset and/or session request from A indicates E.164 number of the called party subscriber B which E.164 number is not an IMS number. The following steps are performed wherein the step numbers correspond to the numbers shown at the arrows of FIG. 12. Steps 3 and 4 may be omitted and utilize only a routing database to route the messages and/or messagesets and/or sessions to own I-CSCFs and foreign DGCFs.

1. A message and/or session initiation request, e.g. INVITE request, is sent from A to P-CSCF 82, indicating the E.164 identifier +358-40-1223344 of B 2. The message or session initiation request, e.g. INVITE, is forwarded from P-CSCF 82 to S-CSCF 83 with +358-40-1223344.

3. S-CSCF 83 conducts Local ENUM/DNS query to database 84 with e.g. 4.4.3.3.2.2.1.0.4.8.5.3.e164.arpa. or 4.4.3.3.2.2.1.0.4.8.5.3.e164.ims.europolitan.se. depending on what the operator uses as root for ENUM-DNS.

4. "Unknown domain", "not found" or alike response or no response at all is received because database 84 does not contain an entry for this identifier.

5. Therefore, the message/messageset/session e.g. the call is routed further to the DGCF 85 in the target network 86 indicated by "+358-40". The message or session initiation request, e.g. INVITE, with +358-40-1223344 is sent from S-CSCF 83 to DGCF 85.

6b. DGCF 85 sends the message/session request e.g. INVITE further to BGCF 88.

7b. The BGCF 88 forwards the message/session request with +358-40-1223344 to MGCF 91.

8b. The MGCF 91 sends the message or session initiation request or a setup request with +358-40-1223344 to non-IMS network e.g. PSTN 93.

Another possible routing could be from DGCF 85 to I-CSCF 87 (step 6a) instead of to BGCF 88 (step 6b). After HSS query from I-CSCF 87 to HSS 89 (steps 7a, 8a), the message or session initiation request may be forwarded to BGCF 88.

In a second routing example, the message and/or messageset and/or session request from subscriber A indicates non-E.164 IMS identifier of the called party subscriber B. The following steps are performed wherein the step numbers correspond to the numbers shown at the arrows of FIG. 12.

1. A message and/or session initiation request, e.g. INVITE request, is sent from A to P-CSCF 82, indicating non-E.164 IMS identifier, e.g. john.smith@ims.sonera.fi.

2. The message or session initiation request, e.g. INVITE, is forwarded from P-CSCF 82 to S-CSCF 83 with the IMS identifier john.smith@ims.sonera.fi.

3-4. No ENUM-DNS query is needed because the identity is not an E.164 identifier.

5. ims.sonera.fi is an address of DGCF 85 to which the message or session request is sent.

6a. DGCF 85 sends the message or session initiation request (e.g. INVITE) further to I-CSCF 87.

7a. The I-CSCF 87 performs a Location request with the name identifier john.smith or john.smitheims.sonera.fi or alike.

8a. The HSS 89 returns the FQDN, e.g. scscf12.ims.sonera.fi, of S-CSCF 90 where the B-subscriber is registered.

9a. The I-CSCF 87 sends the message or session setup request, e.g. INVITE request, to scscf12.ims.sonera.fi.

10a. The S-CSCF 90 may send the message or session setup request directly to the P-CSCF 95. In the present embodiment, the network uses topology hiding and DGCF offers that service too. Therefore, the message or session setup request, e.g. INVITE, is sent to DGCF 92 for hiding purpose. DGCF 92 encrypts the name of S-CSCF 90 and adds its own name to the message to be used as contact point by P-CSCF 95.

11a. DGCF 92 sends the message or session setup request, e.g. INVITE, to the address e.g. pcscf3.ims.radiolinja.fi of P-CSCF 95 of visited network 94.

12a. The P-CSCF 95 sends the message or session setup request, e.g. INVITE request, to the user equipment 96 of B.

In a third routing example, the message and/or messageset and/or session request from A indicates E.164 number of the called subscriber B which E.164 number is an IMS number. The following steps are performed wherein the step numbers correspond to the numbers shown at the arrows of FIG. 12. Steps 3 and 4 may be omitted and utilize only a routing database to route the messages and/or messagesets and/or sessions to own I-CSCFs and foreign DGCFs.

1. A message and/or session initiation request, e.g. INVITE request, is sent from A to P-CSCF 82, indicating the E.164 identifier +358-40-1223344 of B.

2. The message or session initiation request, e.g. INVITE, is forwarded from P-CSCF 82 to S-CSCF 83 with +358-40-1223344.

3. S-CSCF 83 conducts Local ENUM-DNS query to database 84 with e.g. 4.4.3.3.2.2.1.0.4.8.5.3.e164.arpa. or 4.4.3.3.2.2.1.0.4.8.5.3.e164.ims.europolitan.se. depending on what the operator uses as root for ENUM-DNS.

4. "Unknown domain", "not found" or alike response or no response at all is received because database 84 does not contain an entry for this identifier.

5. Therefore, the message/messageset/session e.g. the call is routed further to the DGCF 85 in the target network 86 indicated by "+358-40". The message or session initiation request, e.g. INVITE, with +358-40-1223344 is sent from S-CSCF 83 to DGCF 85.

6b. DGCF 85 sends the message or session initiation request (e.g. INVITE) further to BGCF 88. BGCF 88 finds out that the E.164 number is an IMS number.

7c. The BGCF 88 therefore forwards the message/session request with +358-40-1223344 to I-CSCF 87.

7a. The I-CSCF 87 performs a Location request with the identifier E.164.

8a. The HSS 89 returns the FQDN, e.g. scscf12.ims.sonera.fi, of S-CSCF 90 where the B-subscriber is registered.

9a. The I-CSCF 87 sends the message or session setup request, e.g. INVITE request, to scscf12.ims.sonera.fi.

10a. The S-CSCF 90 may send the message or session setup request directly to the P-CSCF 95. In the present embodiment, the network uses topology hiding. Therefore, the message or session setup request, e.g. INVITE, is sent to DGCF 92 for hiding purpose. DGCF 92 encrypts the name of S-CSCF 90 and adds its own name to the message to be used as contact point by P-CSCF 95.

11a. DGCF 92 sends the message or session setup request, e.g. INVITE, to the address e.g. pcscf3.1 ms.radiolinja.fi of P-CSCF 95 of visited network 94.

12a. The P-CSCF 95 sends the message or session setup request, e.g. INVITE request, to the user equipment 96 of B.

Another possible routing could be step 6a instead of steps 6b and 7c based e.g. on separate number spaces, or on local ENUM-DNS query.

Advantages of the disclosed preferred embodiments of the invention are:

a) If the operator uses DGCF, it avoids offering ENUM service concerning the own E.164 numbers to other operators, because all incoming calls are received by one element i.e. DGCF independently whether the E.164 is an IMS number or not.

b) Load sharing/balancing between I-CSCFs and between BGCFs is done controlled in the own network, not with e.g. round robin via DNS queries from foreign networks.

c) Security aspects (e.g. network topology hiding) and firewall are centralized into one element/functionality type i.e. into DGCF instead of into two element/functionality types i.e. into I-CSCF and BGCF.

d) Fewer contact points in the network.

e) Routing database (e.g. TRIP) for routing between BGCFs in different networks is not needed.

Routing from BGCF to I-CSCF may be provided in case DGCF routes all messages/messagesets/sessions with E.164 to BGCF.

DGCF may divide the traffic by checking the called party address and sending messages/messagesets/sessions with non-E.164 address to I-CSCF and others to BGCF. BGCF routes those calls further to I-CSCF that cannot be routed to MGCF.

DGCF may divide the traffic between I-CSCF and BGCF also by checking media and/or QoS and/or other requirements. DGCF routes to BGCF only the traffic that can be routed further to non-IMS e.g. CS network via MGCF.

The DGCF functionality can be included in the same element with other functionalities e.g. with I-CSCF and/or BGCF or built as a separate NE (Network Element).

According to this embodiment, only one kind of contact point is necessary in the network (DGCF type). Formerly, two types of contact points (I-CSCF and BGCF) had to be provided.

One of the ideas of this embodiment of the invention is thus to use only one contact point type in the network and therefore eliminate the need for separation of the routing in the originating network into two groups: IMS addresses (to I-CSCF) and non IMS addresses (to BGCF). This way ENuM is not needed, neither routing database at BGCF, obtained e.g. with TRIP, containing routing addresses of BGCFs in foreign networks.

As mentioned above, because ENUM-DNS is a local database one cannot be sure whether a certain E.164 number is an IMS identity or not if the ENUM-DNS does not give any answer. In the following embodiment of the invention shown in FIG. 13, this decision is made in BGCF 106 based on the media requirements and/or QoS (i.e. Quality of Service) requirements and/or other requirements. From the media and/or QoS and/or other requirements the embodiment deduces whether the message and/or messageset and/or session should be routed via IMS network 113 or whether the routing via non-IMS e.g. CS network 118 is sufficient. In the first case no breakout is done to non-IMS e.g. CS domain, i.e. the message and/or messageset and/or session is routed to an I-CSCF 111 of a target network 113.

In the second case the message and/or messageset and/or session is routed to a BGCF 110 of the target network 113 or to a MGCF 107 of the own network 105.

In the following, a routing example based on media and/or QoS and/or other requirements is described.

The message and/or messageset and/or session is originated by indicating E.164 number of the called party terminal B 116. The originating message and/or messageset and/or session is originating from subscriber A 100, and A subscriber's home network 105 is in this example Swedish network Europolitan (Europolitan Vodafone).

Figure 13:
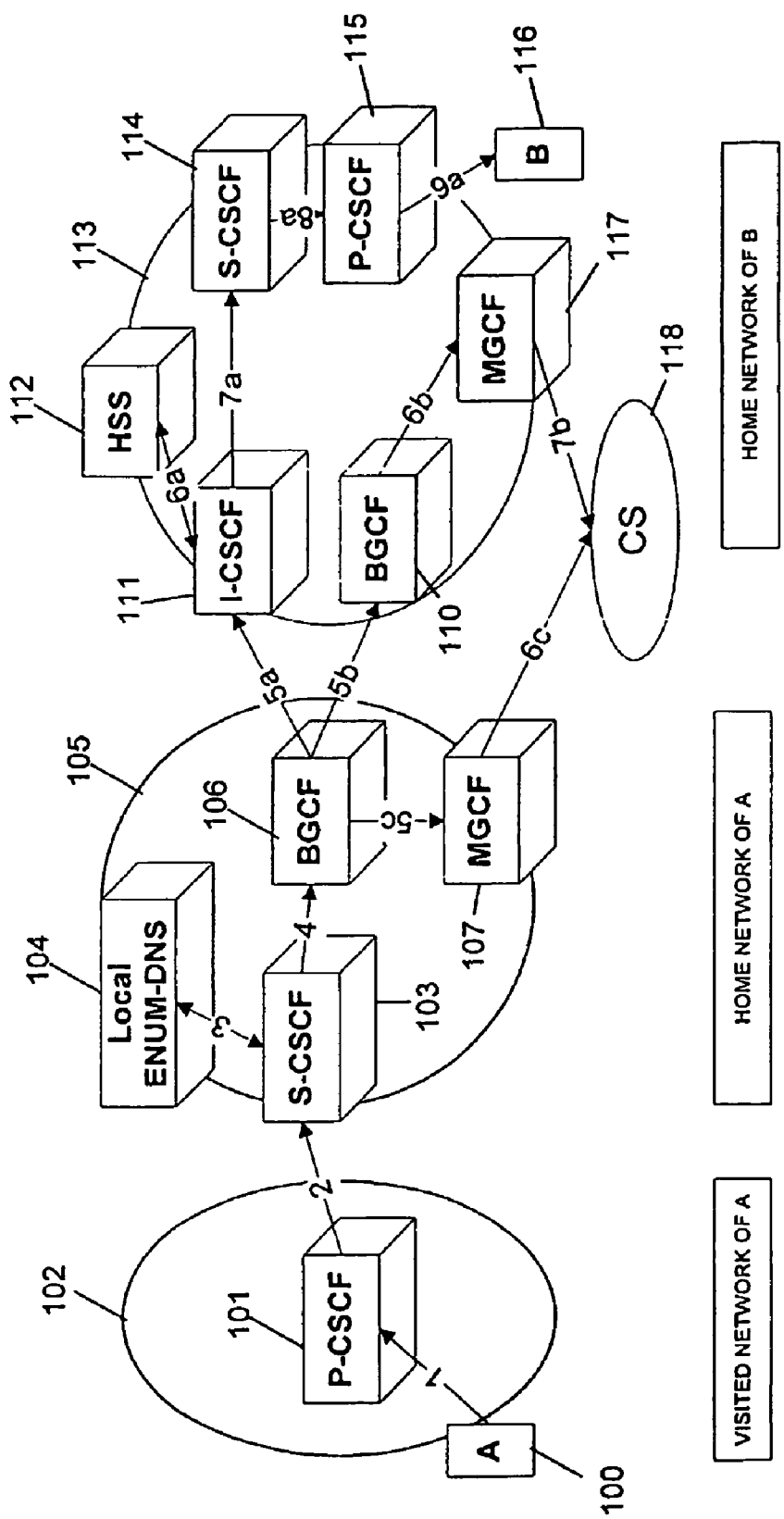
FIG. 13 shows an embodiment providing enhanced routing based on media and/or QoS and/or other requirements.

The following steps are performed wherein the step numbers correspond to the numbers shown at the arrows of FIG. 13.

1. A message or session initiation request, e.g. INVITE request, is sent from A to P-CSCF 101 of visited network 102 visited by subscriber terminal A 100, indicating the E.164 identifier +358-40-1223344 of B 116.

2. The message or session initiation request, e.g. INVITE, is forwarded from P-CSCF 101 to S-CSCF 103 of A's home network 105, indicating the identifier +358-40-1223344.

3. S-CSCF 103 conducts Local ENUM-DNS query to database 104 with 4.4.3.3.2.2.1.0.4.8.5.3.e164.ims.europolitan.se. "Unknown domain", "not found" or alike response or no response at all is received in step 3 because database 104 does not contain an entry for this identifier.

4. Therefore, the message/messageset/session e.g. call is routed further to the BGCF 106 in the own home network 105 where media and/or QoS and/or other requirements are checked, and the message and/or messageset and/or session is routed further depending on the checked requirements so as to comply with the media and/or QoS and/or other requirements accordingly.

5a, 5b, 5c. Depending on the result of the media and/or QoS and/or other requirements check by BGCF 106, step 5a, 5b, or 5c is performed.

5a. Because the message/messageset/session has to be an IMS message/messageset/session according to the checked requirements it is routed through IMS network. The message or session setup request, e.g. INVITE message, is sent from BGCF 106 to I-CSCF 111 of the home network 113 of B 116 with +358-40-1223344.

6a. The I-CSCF 111 performs a Location request to the HSS 112 with the identifier E.164. The HSS 112 returns an identifier, e.g. the FQDN, of S-CSCF 114 where the B-subscriber is registered.

7a. The I-CSCF 111 sends the message or session setup request, e.g. INVITE request, to S-CSCF 114.

8a. The S-CSCF 114 may send the message or session setup request directly to the P-CSCF 115.

9a. The P-CSCF 115 sends the message or session setup request to the B terminal 116.

5b. Because the message/messageset/session is not an IMS message/messageset/session according to the checked requirements it is sufficient to route it through non-IMS network (steps 5b or 5c). As an alternative, the BGCF 106 sends the message or session initiation request (e.g. INVITE) further to BGCF 110.

6b. BGCF 110 forwards the message or session setup request to the MGCF 117 which connects the message or session setup request to the non-IMS e.g. CS network 118 (step 7b).

5c. As a further alternative, the BGCF 106 sends the message or session initiation request (e.g. INVITE) further to MGCF 107.

6c. MGCF 107 forwards the message or session setup request to the non-IMS e.g. CS network 118.

Advantages of this embodiment of the invention are:
a) Efficient routing. The message and/or messageset and/or session is routed according to the proper requirements.
b) No breakout to non-IMS e.g. CS domain if not needed.
c) Reduced signaling.

An idea of this embodiment of the invention is to route the message and/or messageset and/or session from BGCF to I-CSCF in another network if media and/or QoS and/or other requirements cannot be fulfilled in routing via non-IMS e.g. CS network. Otherwise the message/messageset/session e.g. call is routed to BGCF in another network or to MGCF in the own network.

In the previous embodiments of FIG. 3 and FIG. 13 and in the embodiments of FIG. 14 and FIG. 15 explained below, the decision of whether a certain received E.164 number is an IMS identity or not (e.g. in case the ENUM-DNS does not give any answer at the originating S-CSCF), can be made at a network element or network function, preferably a control function such as S-CSCF or BGCF, based on the media and/or QoS (i.e. Quality of Service) requirements, and/or other message or session specific or general requirements. From the requirements it is deduced whether the message and/or messageset and/or session should be routed via IMS network or whether the routing via non-IMS e.g. CS network is sufficient. In the first case no breakout to non-IMS e.g. CS domain is done, i.e. the message and/or messageset and/or session is routed to I-CSCF of the target network. In the second case the message and/or messageset and/or session is routed to a BGCF of the target network or to a MGCF of the own network.

These embodiments of the invention therefore provide means to avoid routing IMS messages and/or messagesets and/or sessions through non-IMS e.g. CS network only because the originating S-CSCF does not get any answer from the local ENUM-DNS. If no means were used there would be the following consequences: Either the same number range cannot be used for both IMS and non-IMS e.g. CS subscribers, or if it is used there is no way to route an IMS message and/or messageset and/or session with E.164 to a bare IMS subscriber i.e. to the subscriber who has no non-IMS e.g. CS subscription (because ENUM-DNS does not give any answer, i.e. NAPTR RR, for the E.164). In the latter case if the subscriber has dual subscription (i.e. both IMS and non-IMS e.g. CS) and a dual terminal, those IMS messages and/or messagesets and/or sessions can be routed through non-IMS e.g. CS network where the media and/or QoS and/or other requirements can be fulfilled with the capabilities offered by the non-IMS e.g. CS network. If the requirements are more than the non-IMS e.g. CS network can offer, the message and/or messageset and/or session is released. Even if the message and/or messageset and/or session could be routed via non-IMS e.g. CS network it is in vain if the subscriber has only IMS subscription.

Figure 14:
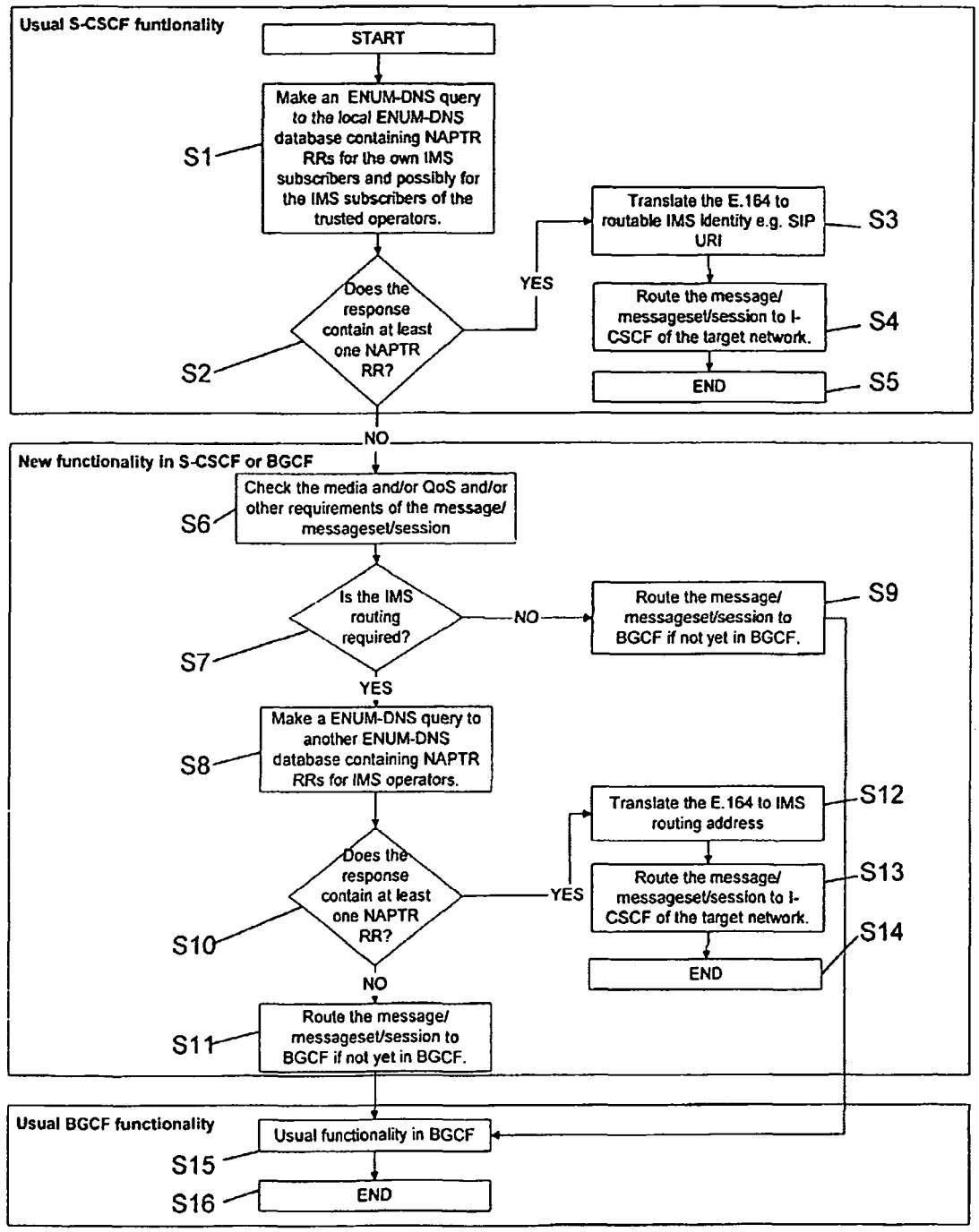
FIG. 14 shows a further embodiment providing enhanced routing based on media and/or QoS and/or other requirements.

FIG. 14 shows an embodiment providing such enhanced routing based on media and/or QoS and/or other requirements. The embodiment of FIG. 14 is in accordance with the above structure and functioning, and illustrates a flow according to both scenarios: 1) routing from S-CSCF to the target network; 2) routing from BGCF to the target network. FIG. 14 also shows the functionality in S-CSCF and BGCF.

Assumptions in the FIG. 14 embodiment are that another ENUM-DNS database is utilized to help routing in the new functionality of S-CSCF or BGCF. Other means could as well be used instead of ENUM-DNS.

The upper block of FIG. 14 illustrates usual S-CSCF functionality.

Upon start of the routine, step S1 makes a ENUM-DNS query to the local ENUM-DNS database using the received identifier of the called party terminal, i.e. the E.164 number. The local ENUM-DNS database contains NAPTR RRs for the own IMS subscribers and possibly for the IMS subscribers of the trusted operators.

In step S2, it is checked whether or not the response contains at least one NAPTR RR. When the check result of step S2 indicates that the response contains at least one NAPTR RR, a step S3 is executed for translating the identifier of the called party terminal, i.e. the E.164 number to routable IMS identity e.g. SIP URI. In a subsequent step S4, the message and/or messageset and/or session is routed to I-CSCF of the target network. Thereupon, the function of the S-CSCF ends, step S5.

The block in the middle of FIG. 14 illustrates new functionality in S-CSCF or BGCF, and will be described below.

When the check result of step S2 indicates that the response of the database in step S1 does not contain at least one NAPTR RR, a step S6 is executed for checking media and/or QoS and/or other requirements of the message and/or messageset and/or session from the received message or session set up request.

In step S7, the result of the check of the media and/or QoS and/or other requirements of the requested message or messageset or session is compared to the media, QoS and other capabilities which can be provided by the selectable networks, e.g. CS network, non-IMS network, IMS network.

The selection of a network is performed in accordance with appropriate selection criteria which may e.g. consider networks availability, networks load, cost criteria, maximum or minimum QoS provided, etc.

When detecting at step S7 that only IMS is able to provide the requested media, QoS and other capabilities so that IMS routing is required, the routine proceeds to step S8 where a further ENUM-DNS query is conducted to another ENUM-DNS database containing NAPTR RRs for IMS operators.

Otherwise, when the answer in Step S7 is no, the program proceeds to step S9, so as to route the message and/or messageset and/or session to BGCF if not yet in BGCF. From step S9, the program proceeds to step S15 where the usual functionality in BGCF is provided. Thereafter the routing program of FIG. 14 is ended, step S16.

The lower block of FIG. 14 illustrates usual functionality in BGCF.

Following step S8, a step S10 is carried out wherein it is checked whether the response received in step S8 contains at least one NAPTR RR.

If the answer to step S10 is yes, the routine proceeds to step S12 in order to translate the E.164 number to IMS routing address. Following step S12, step S13 is carried out where the message and/or messageset and/or session is routed with the IMS routing address to I-CSCF of the target network. Thereafter, the routing routine ends, step S14.

If the answer received in step S10 is no, the routine proceeds to step S11 in order to route the message and/or messageset and/or session to BGCF if not yet in BGCF. Then step S15 follows in the same manner as the response to step S9.

An alternative in S11 is to release the message and/or messageset and/or session because according to the checked requirements the message and/or messageset and/or session cannot be routed through non-IMS e.g. CS network. This alternative is described in FIG. 1 and explained under the solution S1) "Release the message and/or messageset and/or session earlier, possibly already at the originating S-CSCF".

Advantages of the embodiments of the invention are:

a) Operators do not need to reveal the content of their ENUM-DNS databases to other operators.

b) Efficient routing. The message and/or messageset and/or session is routed according to the proper requirements.

c) No breakout to non-IMS e.g. CS domain if not needed.

d) The same number range can be used in IMS and non-IMS e.g. CS networks.

e) Dual terminal is not necessary.

In accordance with this embodiment, an idea is to route the message and/or messageset and/or session normally with E.164 until S-CSCF or BGCF in the originating network. There the media and/or QoS and/or other requirements are checked, and according to these requirements the message and/or messageset and/or session is routed to I-CSCF in the target network if the requirements indicate that the message and/or messageset and/or session is an IMS message and/or messageset and/or session; or otherwise to MGCF in the own network or to BGCF in the target network.

The invention gives also possibility to load sharing. If IP network is overloaded, message and/or messageset and/or sessions where the media and/or QoS and/or other requirements can be fulfilled by the non-IMS e.g. CS network, can be routed via non-IMS e.g. CS network. And vice versa if non-IMS e.g. CS network is overloaded, IP network can be utilized instead.

It may be easier to check the media and/or QoS and/or other requirements and route the message and/or messageset and/or session from BGCF than from S-CSCF to I-CSCF of the target network because BGCF is specialized to route messages and sessions further based on E.164 numbers. BGCF may drop itself out from the path after the "breakout" action. So the successive messages would pass directly from the originating S-CSCF to the terminating S-CSCF when the I-CSCF has also dropped itself out.

On the other hand S-CSCF has the means to route the messages and sessions further to the target network by translating the E.164 to a routable IMS identity e.g. SIP URI with ENUM-DNS. So it may be easier to check the media and/or QoS and/or other requirements already in the S-CSCF.

An idea of this embodiment of the invention is to route the message and/or messageset and/or session from the originating S-CSCF or BGCF to I-CSCF in the terminating network if the media and/or QoS and/or other requirements of the message and/or messageset and/or session indicate that the message and/or messageset and/or session is an IMS message and/or messageset and/or session.

Figure 15:
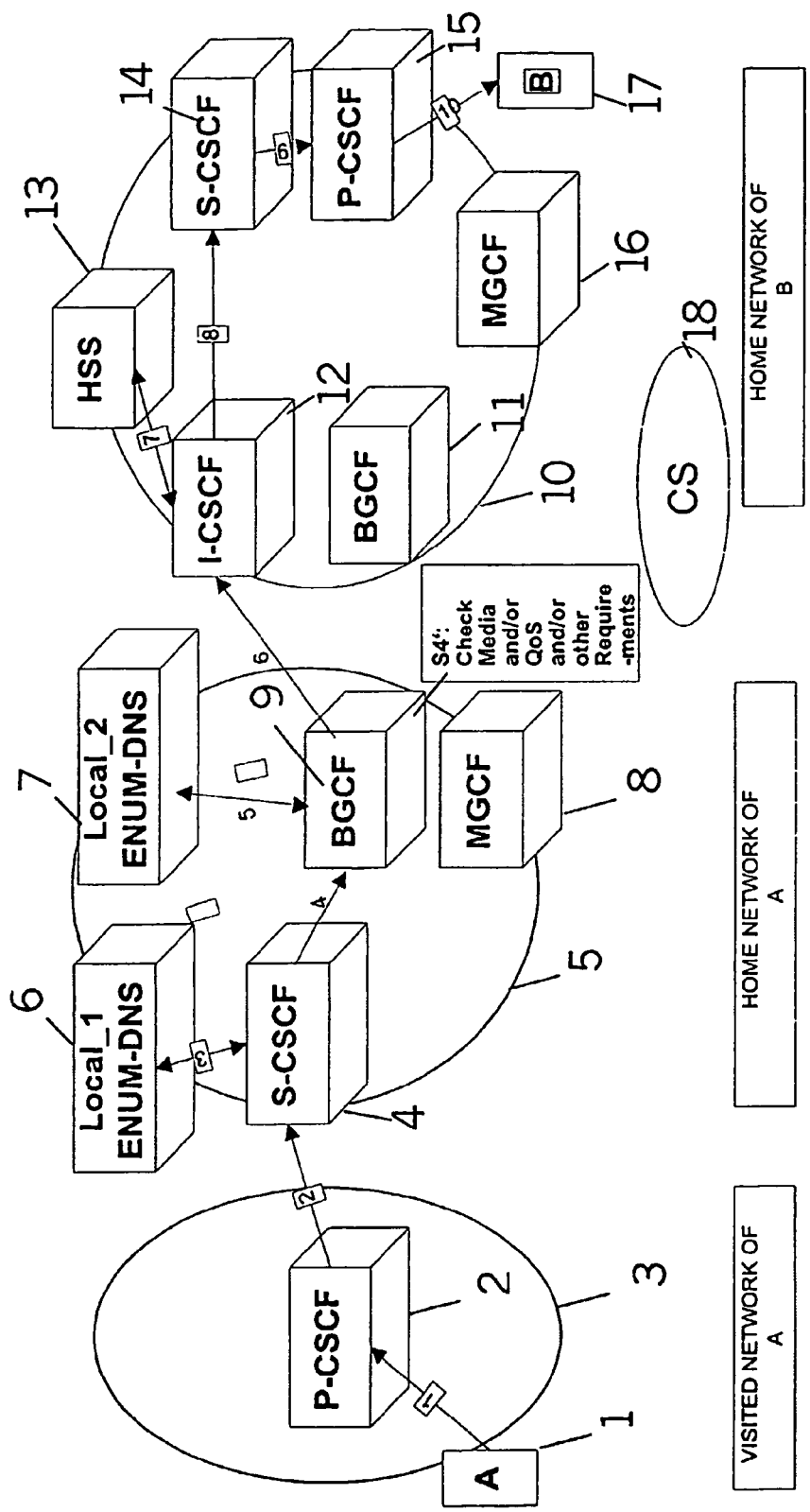
FIG. 15 illustrates another embodiment of the present invention which provides a solution "Route the message and/or messageset and/or session according to the media and/or QoS and/or other requirements".

A further embodiment in accordance with the above described solution S3, "Route the message and/or messageset and/or session according to the media and/or QoS and/or other requirements", is shown in FIG. 15. This embodiment is quite similar to the embodiment of FIG. 3. Hence, the description of FIG. 3 likewise applies to the embodiment according to FIG. 15 unless otherwise stated below. Further, the same numerals as in FIG. 3 are used to designate the same components of the FIG. 15 embodiment.

A difference between the embodiments according to FIGS. 3 and 15 is that it is the S-CSCF 4 in FIG. 3 which checks the media and/or QoS and/or other requirements for routing the message and/or messageset and/or session according to the media and/or QoS and/or other requirements. Contrary thereto, in the embodiment of FIG. 15, the BGCF 9 checks the media and/or QoS and/or other requirements for routing the message and/or messageset and/or session according to the media and/or QoS and/or other requirements.

In another embodiment, both the S-CSCF 4 and the BGCF 9 can check the media and/or QoS and/or other requirements for routing the message and/or messageset and/or session according to the media and/or QoS and/or other requirements.

According to the embodiment of FIG. 15, multimedia IMS messages and/or messageset and/or sessions are routed correctly to the target network. Non multimedia, e.g. voice, messages and/or messagesets and/or sessions are routed to the called party via non-IMS e.g. CS network.

Checking media and/or QoS and/or other requirements is all that is needed.

FIG. 15 illustrate s an example of an information flow according to solution S3. In this example, two local ENUM-DNS database 6, 7 are provided. The local ENUM-DNS database 6 preferably is a ENUM-DNS database containing IMS E.164 identities of subscribers to which the network 5 is the home network. The database 6 may also correspond to the local ENUM-DNS database 6 of FIG. 2, and may include the same or essentially the same content as the latter.

The local ENUM-DNS database 6 may include also IMS E.164 identities of the trusted operators. This part of the database may contain delegations to appropriate ENUM-DNS databases of respective operators following standard DNS principles. The database 7 includes an ENUM-DNS database containing information to find FQDN (FQDN=Fully Qualified Domain Name) of foreign I-CSCFs (i.e. I-CSCFs of other operators/networks). Instead of the database 6 other means may be used to help translating E.164 to corresponding routing address. Instead of the database 7 other means, e.g. routing tables, may be used to find address of foreign I-CSCFs.

A HSS query (HSS=Home Subscriber Server), step 7, is also involved, as shown in FIG. 15.

The embodiment of FIG. 15 includes the following steps.

1) A message or session request message, e.g. SIP INVITE message, indicating the E.164 number of a called party, e.g. +358-50-22112233 which may be E.164 of Radiolinja's IMS subscriber, is sent from user equipment A to P-CSCF 2 of the visited network 3 visited by (e.g. roaming) subscriber A 1.

2) The P-CSCF 2 of the visited network 3 sends a message or session request message, e.g. INVITE message, to the S-CSCF 4 of A subscriber's home network 5, indicating the E.164 number of the called party, +358-50-22112233.

3) The S-CSCF 4 of the home network 5 performs a local IMS ENUM-DNS query to the local ENUM-DNS database 6, indicating the E.164 number. When assuming that the local ENUM-DNS database 6 does not contain the called IMS subscribers, there will be, in this case, an "unknown domain", "not found" or alike response or no response at all from ENUM-DNS database 6.

3') Because no NAPTR resource records were received from ENUM-DNS database 6, the IMS identity is considered non-IMS identity.

4) The message or session setup request is then routed to BGCF 9 of the home network 5 of subscriber A.

S4') The BGCF 9 checks the media requirements and/or QoS requirements and/or other requirements of the message/messageset/session by checking the information contained in the request received from P-CSCF 2/S-CSCF4 in order to decide whether the message/messageset/session can be routed through non-IMS (e.g. CS) network or whether it should be routed via IMS network.

5) When the message/messageset/session has to be routed via IMS network, the E.164 is regarded as an IMS identity. In order to route to the I-CSCF 12 the address of the I-CSCF 12 is needed.

The BGCF 9 of the home network 5 therefore performs a local IMS ENUM-DNS query to the local ENUM-DNS database 7, indicating the E.164 number. Routing address to I-CSCF 12 is built with the help of NAPTR RRs received from the local ENUM-DNS database 7.

6) When the check of step 4) indicates that the message/messageset/session cannot be routed through non-IMS network, the message/messageset/session is then routed further from BGCF 9 to the I-CSCF 12 in the home network 10 of subscriber B.

7) The I-CSCF 12 performs a HSS 13 query using the E.164 number. The HSS 13 returns the address of S-CSCF 14 of the home network 10 of subscriber B.

8) The message/messageset/session is then routed to the indicated S-CSCF 14.

9) A message/session request, e.g. INVITE message is sent from S-CSCF 14 to P-CSCF 15 of network 10 of B, indicating IMS identity of B.

10) The P-CSCF 15 routes the message/messageset/session to subscriber 17 so that the message/messageset/session is transmitted/established from A to B.

When the check performed in step 4) of FIG. 15 should indicate that the message/messageset/session need not to be routed via IMS network, the message/messageset/session may be routed via non-IMS network i.e. from BGCF 9 via MGCF 8, and CS network 18, to entity 17.

Generally, for all above described embodiments, it is to note that BGCF is a functionality that may be implemented as an own network element or included in another functionality and/or another network element e.g. S-CSCF.

Likewise, DGCF is a functionality that may be implemented as an own network element or included in another functionality and/or another network element e.g. I-CSCF and/or BGCF.

Further, QoS and/or media requirements are only examples of the checks that may be needed to decide what is the correct routing. Instead of or in addition to them other checks may be needed and/or done.

In the above text, the notation "message/session" means "message and/or session". In the above text, the notation "message/messageset/session" means "message and/or messageset and/or session".

The invention can be applied-in addition to IMS networks—also to other networks e.g. WLAN; and other IP based networks; or in general to whatever two networks that use a third network, which cannot fulfill the same media and/or QoS and/or other requirements as the first and the second network, to carry part of the traffic from the first network to the second network via the third network. The part of the traffic may be traffic addressed with whatever numbering system e.g. E.164. The idea of ENUM can be applied—in addition to E.164—also to other numbering systems.

In this invention the ENUM can always be replaced with other means e.g. with routing tables, databases, tables, lists or alike independently whether it is used at the originating S-CSCF to transform E.164 to an IMS address or elsewhere to get a routing address to the next network element.

SIP URL and SIP URI are used interchangeable i.e. they both mean a valid address that can be used in SIP. Thus, a valid IMS routing address may be e.g. SIP URI or SIP URL. As an example, routing of SIP signalling within the IMS may use SIP URLs. According to the current standard draft E.164 format public user identities should not be used for routing within the IMS, and session requests based upon E.164 format public user identities will require conversion into SIP URL format for internal IMS usage.

ENUM-DNS and ENUM/DNS and ENUM+DNS are used interchangeable. CS, GSM and PSTN networks are some examples of non-IMS networks.

The invention is not limited to use only ENUM-DNS in order to answer the question (Q1), whether the target identifier i.e. the E.164 number is a valid IMS identity. In addition to ENUM-DNS or instead of ENUM-DNS also other means e.g. table(s), list(s), file(s), database(s) or alike may be used in the invention.

The invention is not limited to use only ENUM-DNS in order to route messages and/or messagesets and/or sessions such as E.164 messages and/or messagesets and/or sessions. In addition to ENUM-DNS or instead of ENUM-DNS also other means e.g. routing table(s), routing list(s), routing file(s), routing database(s) or alike may be used in the invention.

In accordance with a main idea of some of the embodiments of the invention, a single method (i.e. ENUM-DNS) is used for all E.164 routing by combining the existing ENUM-DNS database, e.g. in TS 23.228, with a new ENUM-DNS database to create a complete routing method for E.164. And to reuse the existing ENUM-DNS database, e.g. in TS 23.228, to create a new routing feature: routing from terminating BGCF to I-CSCF.

Further, an additional or alternative idea of the invention implemented in some of the embodiments is to route E.164 and logical names separately and without any help of ENUM-DNS databases and allow routing between I-CSCF and BGCF (in the same network) to both directions.

According to a main idea of some of the embodiments of the invention, only one contact point type is used in the network and thus the need for separation of the routing in the originating network into two groups is eliminated: IMS addresses (to I-CSCF) and non IMS addresses (to BGCF). Therefore ENUM is not needed, neither routing database, e.g. TRIP, for routing between BGCFs in different networks.

According to some of the embodiments of the invention, a message and/or messageset and/or session is routed from the own S-CSCF or BGCF to I-CSCF in another network if media and/or QoS and/or other requirements cannot be fullfilled in routing via non-IMS e.g. CS. Otherwise the message and/or messageset and/or session e.g. call is routed from own BGCF to BGCF in another network or to MGCF in the own network.

A further alternative or additional teaching of the invention is to route a message and/or messageset and/or session from the originating S-CSCF or BGCF to I-CSCF in the terminating network if the media and/or QoS and/or other requirements of the message and/or messageset and/or session tell that it is an IMS session.

In some of the above embodiments, a BGCF is used as a contact point (e.g. depending on the routing to BGCF or I-CSCF). Instead of a BGCF, any appropriate network element or control function can be used as such contact point.

Further, presently CSCF is usually understood as Call State Control Function. CSCF may also mean Call session Control Function in some or all cases, e.g. in a future naming.

In the above description, one or two or three databases, e.g. ENUM-DNS databases or provided. It is to be understood that these first, second and/or third databases may be located in the same entity, or in different entities. These terms are mainly used to describe the type of information the databases contain.

The ENUM databases of the first network can be combined in such a way that if the first query to the first database does not yield any NAPTR resource records, then the second ENUM database will automatically be queried and the routing address to a contact point to the second network is received. So the ENUM database query can be transparent even to the network element/functionality level (e.g. S-CSCF or BGCF level). This way only one query needs to be done by the network element/functionality to get the routing address to a contact point to the second network.

The invention is not limited to use only E.164 numbering schemes, also messages and/or messagesets and/or sessions using other numbering schemes e.g. E.212 can be routed with this invention.

The invention is not limited to use only access networks of IMS but also other access networks can be used.

The invention is not limited to use only terminals and/or user equipments of IMS but also other kind of terminals and/or user equipments can be used.

LIST OF USED ABBREVIATIONS

BGCF Breakout Gateway Control Function
CS Circuit Switched
CSCF Call State Control Function, or Call Session Control Function
DNS Domain Name System
ENUM is defined in RFC 2916 "E.164 number and DNS"
ENUM-DNS ENUM on DNS
FQDN Fully Qualified Domain Name
GMSC Gateway MSC
GSM Global System for Mobile Communications
HSS Home Subscriber Server
I-CSCF Interrogating Call State Control Function
IM IP Multimedia
IMS IP Multimedia Core Network Subsystem (see 3GPP TS 23.228)
IP Internet Protocol
LN Logical Name
MGCF Media Gateway Control Function
NAPTR Naming Authority Pointer (see RFC 2915), RR of DNS
NE Network Element
PSTN Public Switched Telephone Network
QoS Quality of Service
RR Resource Record of DNS
S-CSCF Serving Call State Control Function
SIP Session Initiation Protocol (see RFC 3261, old: RFC 2543)
SIP URI see RFC 3261 (SIP URL in RFC 2543)
SIPS URI secure SIP URI, see RFC 3261
SRV A DNS RR for specifying the location of services (DNS SRV) (RFC 2782)
TRIP A Framework for Telephony Routing over IP (RFC 2871)
URI Uniform Resource Identifier
URL Uniform Resource Locator Although preferred embodiments have been described above, the invention is not limited thereto and may also be implemented in other ways, e.g. by combining, in any arbitrary fashion, one or more features of one or more embodiments with one or more features of other embodiments.

The invention claimed is:

1. A method comprising:
   initiating a message, message set or session setup request in a first network, wherein the first network comprises a switched telephone network,
   routing the message, message set or session setup request from the switched telephone network to a media gateway control function of a second network of a different type from the first network, and
   routing the message, message set or session setup request from the media gateway control function to a breakout gateway control function,
   the breakout gateway control function deciding on the routing of the message, message set or session setup request.

2. A system comprising:
   means for initiating a message, message set or session setup request in a first network, wherein the first network comprises a switched telephone network,
   means for routing the message, message set or session setup request from the switched telephone network to a media gateway control function of a second network of a different type from the first network, and
   means for routing the message, message set or session setup request from the media gateway control function to a breakout gateway control function of the second network,
   wherein the breakout gateway control function is adapted to decide on the routing of the message, message set or session setup request.

3. A media gateway control function comprising:
   means for receiving a message, message set or session set up request from a first network of a first type, wherein the first network comprises a switched telephone network, and
   means for routing the message, message set or session setup request to a breakout gateway control function of a second network of a second type different from the first type, the media gateway control function being provided in the second network.

4. The media gateway control function according to claim 3, wherein the switched telephone network is a circuit switched network and the second network is a packet switched network.

5. A breakout gateway control function comprising:
   means for receiving a message, message set or session setup request from a media gateway control function, the message, message set or session setup request being initiated in a first network of a first type, and
   means for deciding on the routing the received message, message set or session set up request, wherein the first network is a switched telephone network, and the media gateway control function and the breakout gateway control function are provided in a second network of a second type different from the first type.

6. The breakout gateway control function according to claim 5, wherein the decision is based on an identifier received with the message, message set or a session setup request.

7. The breakout gateway control function according to claim 5, wherein the decision is routing the received message, message set or session set up request to an interrogating call state control function or to another breakout gateway control function.

8. The breakout gateway control function according to claim 5, wherein the breakout gateway control function serves as a transit exchange, and/or the switched telephone network is a circuit switched network and the second network is a packet switched network.

9. A method comprising:
   receiving a message, message set or session setup request, at a media gateway control function, from a first network of a first type, the first network comprising a switched telephone network, and
   routing the message, message set or session setup request from the media gateway control function to a breakout gateway control function of a second network of a second type different from the first type.

10. A method comprising:
    receiving a message, message set or session setup request from a media gateway control function, the message, message set or session setup request being initiated in a first network of a first type, and
    deciding on the routing the received message, message set or session setup request,
    wherein the first network is a switched telephone network, and the media gateway control function and a breakout gateway control function to which the media gateway control function routes the received message, message set or session setup request are provided in a second network of a second type different from the first type.

11. The method according to claim 10, wherein the decision is based on an identifier received with the message, message set or a session setup request.

12. The method according to claim 10, wherein the decision is routing the message, message set or a session setup request to an interrogating call state control function in the second network or to another breakout gateway control function in another network.

13. The method according to claim 10, wherein the breakout gateway control function serves as a transit exchange, and/or
    the switched telephone network is a circuit switched network and the second network is a packet switched network.

* * * * *